(12) United States Patent
Mehmood et al.

(10) Patent No.: US 8,228,902 B2
(45) Date of Patent: *Jul. 24, 2012

(54) SEPARATION OF VALIDATION SERVICES IN VOIP ADDRESS DISCOVERY SYSTEM

(75) Inventors: Hakim N. Mehmood, Broomfield, CO (US); Mark L. Hendrickson, Lafayette, CO (US); Jonathan David Rosenberg, Freehold, NJ (US); Cullen F. Jennings, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 12/495,615

(22) Filed: Jun. 30, 2009

(65) Prior Publication Data

US 2009/0323677 A1 Dec. 31, 2009

Related U.S. Application Data

(63) Continuation-in-part of application No. 11/780,928, filed on Jul. 20, 2007.

(51) Int. Cl.
*H04L 12/28* (2006.01)
(52) U.S. Cl. ......... 370/353; 370/354; 370/400; 370/401
(58) Field of Classification Search .......... 370/351–354, 370/356, 386, 389, 392, 395.31, 395.52, 370/400, 401, 402, 494
See application file for complete search history.

(56) References Cited

U.S. PATENT DOCUMENTS

| 5,590,370 | A | 12/1996 | Asthana et al. | 395/800 |
| 5,699,514 | A | 12/1997 | Durinovic-Johri et al. | 395/188.01 |
| 6,012,144 | A * | 1/2000 | Pickett | 726/26 |
| 6,088,683 | A * | 7/2000 | Jalili | 705/26.8 |
| 6,295,575 | B1 | 9/2001 | Blumenau et al. | 711/5 |
| 6,404,870 | B1 | 6/2002 | Kia et al. | 379/144.01 |
| 6,529,501 | B1 | 3/2003 | Zhao et al. | 370/353 |
| 6,674,850 | B2 | 1/2004 | Vu et al. | 379/220.01 |
| 6,700,964 | B2 * | 3/2004 | Schmid et al. | 379/189 |
| 6,950,652 | B2 | 9/2005 | Janssen et al. | 455/419 |
| 6,961,334 | B1 * | 11/2005 | Kaczmarczyk | 370/354 |
| 7,016,343 | B1 | 3/2006 | Mermel et al. | 370/356 |

(Continued)

FOREIGN PATENT DOCUMENTS

EP 1 009 153 A1 6/2000

(Continued)

OTHER PUBLICATIONS

Seedorf, Jan; SIP Security: Status Quo and Future Issues; Dec. 27, 2006; 23rd Chaos Communication Congress; pp. 1-5.*

(Continued)

*Primary Examiner* — Robert Scheibel
*Assistant Examiner* — Mark A Mais
(74) *Attorney, Agent, or Firm* — Brinks Hofer Gilson & Lione

(57) ABSTRACT

In one embodiment, an apparatus may receive at least one call attribute of a public switched telephone network (PSTN) call initiated to a destination telephone number. The apparatus may verify a destination Voice-over-Internet-Protocol (VoIP) call agent for the destination telephone number based on demonstrated knowledge of the PSTN call. The apparatus may transmit an indication the destination VoIP call agent is verified for the destination telephone number.

22 Claims, 15 Drawing Sheets

U.S. PATENT DOCUMENTS

| | | | |
|---|---|---|---|
| 7,143,052 B2 | 11/2006 | LaSalle et al. | 705/7 |
| 7,188,138 B1 | 3/2007 | Schneider | 709/203 |
| 7,190,772 B2* | 3/2007 | Moisey et al. | 379/114.27 |
| 7,218,722 B1* | 5/2007 | Turner et al. | 379/221.02 |
| 7,266,114 B2 | 9/2007 | Furukawa et al. | 370/352 |
| 7,289,493 B1 | 10/2007 | Vera | 370/356 |
| 7,352,856 B2* | 4/2008 | Matsuhashi et al. | 379/387.02 |
| 7,383,572 B2* | 6/2008 | Rolfe | 726/5 |
| 7,394,803 B1* | 7/2008 | Petit-Huguenin et al. | 370/352 |
| 7,457,283 B2* | 11/2008 | Dalton et al. | 370/352 |
| 7,602,734 B2 | 10/2009 | Tang et al. | 370/254 |
| 7,729,700 B2* | 6/2010 | Alemany et al. | 455/436 |
| 7,822,188 B1 | 10/2010 | Kirchhoff et al. | 379/211.02 |
| 7,852,831 B2* | 12/2010 | Akbar | 370/352 |
| 7,855,982 B2* | 12/2010 | Ramankutty et al. | 370/259 |
| 7,983,243 B2* | 7/2011 | Casey et al. | 370/352 |
| 8,040,875 B2* | 10/2011 | Barclay et al. | 370/352 |
| 2001/0032310 A1 | 10/2001 | Corella | 473/524 |
| 2002/0004900 A1 | 1/2002 | Patel | 713/155 |
| 2003/0053605 A1* | 3/2003 | Cashiola | 379/88.17 |
| 2003/0055898 A1 | 3/2003 | Yeager et al. | 709/205 |
| 2004/0067761 A1 | 4/2004 | Pyhalammi et al. | 455/466 |
| 2005/0232428 A1* | 10/2005 | Little et al. | 380/277 |
| 2006/0182029 A1* | 8/2006 | Kealy et al. | 370/230 |
| 2006/0216131 A1 | 9/2006 | Jhuang | 411/181 |
| 2006/0294576 A1* | 12/2006 | Cross et al. | 726/1 |
| 2007/0183440 A1 | 8/2007 | Bennet et al. | 370/419 |
| 2007/0201660 A1 | 8/2007 | Lan et al. | 379/201.01 |
| 2007/0248098 A1 | 10/2007 | Chen | 370/395.2 |
| 2008/0052270 A1 | 2/2008 | Karlsson | 707/3 |
| 2008/0292077 A1 | 11/2008 | Vinokurov et al. | 379/142.04 |
| 2009/0022149 A1 | 1/2009 | Rosenberg et al. | 370/389 |
| 2009/0022150 A1 | 1/2009 | Rosenberg et al. | 370/389 |
| 2009/0022155 A1 | 1/2009 | Rosenberg et al. | 370/392 |
| 2009/0025075 A1 | 1/2009 | Chow et al. | 726/10 |
| 2009/0100262 A1 | 4/2009 | Yoo | 713/155 |
| 2010/0002686 A1 | 1/2010 | Rosenberg et al. | 370/352 |
| 2010/0002687 A1 | 1/2010 | Rosenberg et al. | 370/352 |
| 2010/0046507 A1 | 2/2010 | Rosenberg et al. | 370/352 |
| 2010/0082828 A1 | 4/2010 | Jennings et al. | 709/229 |
| 2010/0157853 A1 | 6/2010 | Li et al. | 370/271 |

FOREIGN PATENT DOCUMENTS

| | | |
|---|---|---|
| EP | 1 385 323 A1 | 1/2004 |
| EP | 1 555 786 A1 | 7/2005 |
| EP | 1 855 104 A1 | 2/2008 |
| JP | 2004-040541 | 2/2004 |
| JP | 2004-304281 | 10/2004 |
| WO | WO 2009/014974 A1 | 1/2009 |

OTHER PUBLICATIONS

Seedorf, Jan; Using Cryptographically Generated SIP-URIs to protect the integrity of content in P2P-SIP; Third Annual VoIP Security Workshop; Jun. 2, 2006.*

Niccolini, Saverio; SPIT Prevention: state of the art and research challenges; Third Annual VoIP Security Workshop; Jun. 2, 2006.*

Materna, Bogden; Threat Mitigation for VoIP; Third Annual VoIP Security Workshop; Jun. 2, 2006.*

Hansen et al.; Developing a Legally Compliant Reachability management system as a Countermeasure against SPIT; Third Annual VoIP Security Workshop; Jun. 2, 2006.*

Jennings et al.; Verification Involving PSTN Reachability: Requirements and Architecture Overview; Apr. 1, 2011; Internet Engineering Task Force; Version 00; pp. 1-41.*

Marias et al.; SIP Vulnerabilities and Anti-SPIT Mechanisms Assessment; Aug. 16, 2007; IEEE Computer Communications and Networks, 2007. Proceedings of 16th International Conference on Computer Communications and Networks (ICCCN), 2007; pp. 597-604.*

Office Action dated Oct. 6, 2010, pp. 1-11, U.S. Appl. No. 12/370,384, U.S. Patent and Trademark Office, Virginia.

Freedman, M., Morris, R., Tarzan: A Peer-to-Peer Anonymizing Network Layer, dated 2002, pp. 1-14, ACM, Washington, D.C.

Tor: Overview, dated Mar. 2, 2009, pp. 1-5, The Tor Project, Inc., available at www.torproject.org.

Wang, X., Chen, S., Jajodia, S., Tracking Anonymous Peer-to-Peer VoIP Calls on the Internet, dated 2005, pp. 1-11, ACM, Alexandria, Virginia.

Ramasubramanian, V., Sirer, E., Perils of Transitive Trust in the Domain Name System, dated May 13, 2005, pp. 1-6, Cornell University, available at http://ecommons.library.cornell.edu.

Walsh, K., Sirer, E., Experience with an Object Reputation System for Peer-to-Peer Filesharing, dated 2006, pp. 1-14, USENIX Association.

Office Action, dated May 20, 2010, pp. 1-14, U.S. Appl. No. 11/780,975, U.S. Patent and Trademark Office, Virginia.

International Search Report dated Apr. 5, 2010, pp. 1-3, International Application No. PCT/US2010/022004, European Patent Office, The Netherlands.

Written Opinion dated Apr. 5, 2010, pp. 1-7, Application No. PCT/US2010/022004, European Patent Office, Germany.

U.S. Appl. No. 12/370,384, Rosenberg et al.

U.S. Appl. No. 12/367,930, Rosenberg.

U.S. Appl. No. 12/495,639, Rosenberg et al.

U.S. Appl. No. 12/495,595, Jennings et al.

Wu, T., The SRP Authentication and Key Exchange System, dated Sep. 2000, pp. 1-11, The Internet Society.

Rosenberg, J., Jennings, C., The Session Initiation Protocol (SIP) and Spam, dated Jan. 2008, pp. 1-37, The IETF Trust.

Falstrom, P., "E 164 number and DNS", Request for Comments No. 2916, Network Working Group, Sep. 2000, p. 1-9, Cisco Systems, Inc.

International Search Report dated Dec. 12, 2008, pp. 1-5, International Application No. PCT/US2008/070259, European Patent Office, The Netherlands.

Written Opinion dated Dec. 12, 2008, pp. 1-6, Application No. PCT/US2008/070259, European Patent Office, Germany.

Call detail record, dated May 5, 2009, pp. 1-2, Wikipedia, http://en.wikipedia.org/wiki/Call_detail_record.

Computer telephony integration, dated May 12, 2009, pp. 1-4, Wikipedia, http://en.wikipedia.org/wiki/Computer_telephony_integration.

Provisioning Protocol-Specific Interfaces, dated 2007, pp. 1-2, available at www.cisco.com, Cisco.

Neuman, C., Hartman, S., Raeburn, K., RFC 4120, dated Jul. 2005, pp. 1-139, The Internet Society.

Understanding DNSBL Filtering, Spamhaus, dated Oct. 25, 2007, pp. 1-3, www.spamhaus.org.

Bryan, D., Matthews, P., Shim, E., Willis, D., Concepts and Terminology for Peer to Peer SIP, dated Jun. 2007, pp. 1-26, IETF.

Notice of Allowance, dated Sep. 14, 2010, pp. 1-6, U.S. Appl. No. 11/780,975, U.S. Patent and Trademark Office, Virginia.

Office Action, dated Jan. 7, 2011, pp. 1-43, U.S. Appl. No. 12/367,930, U.S. Patent and Trademark Office, Virginia.

Office Action, dated Jan. 7, 2011, pp. 1-43, U.S. Appl. No. 12/495,595, U.S. Patent and Trademark Office, Virginia.

Office Action, dated Jan. 6, 2011, pp. 1-49, U.S. Appl. No. 11/780,928, U.S. Patent and Trademark Office, Virginia.

Office Action, dated Jan. 6, 2011, pp. 1-43, U.S. Appl. No. 11/780,941, U.S. Patent and Trademark Office, Virgina.

Office Action, dated Jan. 13, 2011, pp. 1-53, U.S. Appl. No. 12/495,639, U.S. Patent and Trademark Office, Virginia.

Office Action, dated Jan. 20, 2011, pp. 1-56, U.S. Appl. No. 12/608,484, U.S. Patent and Trademark Office, Virginia.

Office Action, dated Feb. 4, 2011, pp. 1-71, U.S. Appl. No. 12/608,545, U.S. Patent and Trademark Office, Virginia.

Office Action, dated Mar. 8, 2011, pp. 1-34, U.S. Appl. No. 12/370,384, U.S. Patent and Trademark Office, Virginia.

International Search Report, dated Nov. 4, 2010, pp. 1-3, International Application No. PCT/US2010/037459, European Patent Office, The Netherlands.

Written Opinion, dated Nov. 4, 2010, pp. 1-8, International Application No. PCT/US2010/037459, European Patent Office, The Netherlands.

Rosenberg, J. et al., RFC 5039—The Session Initiation Protocol (SIP) and Spam, dated Jan. 2008, pp. 1-27, www.rfc-editor.org/rfc/rfc5039.txt.

Rosenberg, J. et al., The Session Initiation Protocol (SIP) and Spam—draft-rosenberg-sipping-spam-00, dated Jul. 11, 2004, pp. 1-21, IETF, http://tools.ietf.org/html/draft-rosenberg-sipping-spam-00.

Cao, Feng et al., Providing Response Identity and Authentication in IP Telphony, dated 2006, pp. 1-8, IEEE Computer Society.

International Preliminary Report on Patentability, dated Jan. 26, 2010, pp. 1-7, International Application No. PCT/US2008/070259, International Bureau of WIPO, Switzerland.

Lack of Unity Action and Partial International Search, dated Mar. 3, 2011, pp. 1-6. International Application No. PCT/US2010/051820, European Patent Office, The Netherlands.

d'Heureuse, Nico et al., Protecting SIP-based Networks and Services from Unwanted Communications, dated 2008, pp. 1-5, IEEE.

Chiang, Hsia-Ling et al., A Study of Global Numbering Plan With Active Anti-Spit Capability on Voip, dated 2008, pp. 17-22, IEEE.

Office Action, dated Nov. 1, 2011, pp. 1-41, U.S. Appl. No. 11/780,928, U.S. Patent and Trademark Office, Virginia.

Office Action, dated Nov. 3, 2011, pp. 1-41, U.S. Appl. No. 11/780,941, U.S. Patent and Trademark Office, Virginia.

European Office Action, dated Nov. 14, 2011, pp. 1-4, European Patent Application No. 08781931.4, European Patent Office, Germany.

International Search Report, dated Mar. 18, 2011, International Application No. PCT/US2010/051822, European Patent Office, The Netherlands.

Office Action, dated Jun. 22, 2011, pp. 1-40, U.S. Appl. No. 11/780,928, U.S. Patent and Trademark Office, Virginia.

Office Action, dated Jun. 22, 2011, pp. 1-31, U.S. Appl. No. 11/780,941, U.S. Patent and Trademark Office, Virginia.

Office Action, dated Jun. 24, 2011, pp. 1-34, U.S. Appl. No. 12/608,545, U.S. Patent and Trademark Office, Virginia.

Office Action, dated Jun. 27, 2011, pp. 1-38, U.S. Appl. No. 12/367,930, U.S. Patent and Trademark Office, Virginia.

Office Action, dated Jun. 27, 2011, pp. 1-40, U.S. Appl. No. 12/495,639, U.S. Patent and Trademark Office, Virginia.

Office Action, dated Jun. 27, 2011, pp. 1-41, U.S. Appl. No. 12/608,484, U.S. Patent and Trademark Office, Virginia.

Office Action, dated Jun. 27, 2011, pp. 1-35, U.S. Appl. No. 12/495,595, U.S. Patent and Trademark Office, Virginia.

International Search Report, dated Jun. 29, 2011, International Application No. PCT/US2010/051820, European Patent Office, The Netherlands.

Notice of Allowance, dated Aug. 18, 2011, pp. 1-10, U.S. Appl. No. 12/370,384, U.S. Patent and Trademark Office, Virginia.

International Preliminary Report on Patentability, dated Aug. 9, 2011, pp. 1-7, International Application No. PCT/US2010/022004, International Bureau of WIPO, Switzerland.

Notice of Allowance, dated Apr. 7, 2011, pp. 1-17, U.S. Appl. No. 11/780,975, U.S. Patent and Trademark Office, Virginia.

Notice of Allowance, dated Jul. 28, 2011, pp. 1-9, U.S. Appl. No. 11/780,975, U.S. Patent and Trademark Office, Virginia.

Notice of Allowance, dated Oct. 5, 2011, pp. 1-8, U.S. Appl. No. 12/370,384, U.S. Patent and Trademark Office, Virginia.

Notice of Allowance, dated Feb. 16, 2011, pp. 1-11, U.S. Appl. No. 11/780,928, U.S. Patent and Trademark Office, Virginia.

Notice of Allowance, dated Feb. 22, 2012, pp. 1-11, U.S. Appl. No. 11/780,941, U.S. Patent and Trademark Office, Virginia.

Office Action, dated Jan. 5, 2012, pp. 1-41, U.S. Appl. No. 12/367,930, U.S. Patent and Trademark Office, Virginia.

Office Action, dated Jan. 23, 2012, pp. 1-41, U.S. Appl. No. 12/608,484, U.S. Patent and Trademark Office, Virginia.

Office Action, dated Jan. 23, 2012, pp. 1-41, U.S. Appl. No. 12/608,545, U.S. Patent and Trademark Office, Virginia.

Office Action, dated Jan. 23, 2012, pp. 1-39, U.S. Appl. No. 12/495,639, U.S. Patent and Trademark Office, Virginia.

Office Action, dated Jan. 25, 2012, pp. 1-48, U.S. Appl. No. 12/495,595, U.S. Patent and Trademark Office, Virginia.

International Preliminary Report on Patentability and Written Opinion, dated Jan. 12, 2012, pp. 1-8, International Application No. PCT/US2010/037459, International Bureau of WIPO, Switzerland.

* cited by examiner

SEPARATION OF VALIDATION SERVICES IN VOIP ADDRESS DISCOVERY SYSTEM

This application claims priority under 35 U.S.C. §120 to U.S. patent application Ser. No. 11/780,928, "USING PSTN REACHABILITY TO VERIFY VOIP CALL ROUTING INFORMATION" filed Jul. 20, 2007, the entire contents of which are hereby incorporated herein by reference.

TECHNICAL FIELD

This disclosure relates generally to Voice over Internet Protocol (VoIP).

BACKGROUND

Voice over Internet protocol (VoIP) systems manage the delivery of voice information over the Internet. VoIP involves sending voice information in digital form in discrete packets rather than using the traditional circuit-committed protocols of the public switched telephone network (PSTN). VoIP is also referred to as IP Telephony, Internet telephony, Broadband telephony, Broadband Phone, and Voice over Broadband. A major advantage of using VoIP is that it avoids the tolls charged by ordinary telephone service providers. As such, VoIP systems are becoming ever more common within enterprises.

A VoIP call typically involves a signaling session and a media session. The signaling can be accomplished using various protocols such as Session Initiation Protocol (SIP), H.323 Protocol, or any other suitable signaling protocols. SIP is an application-layer control (signaling) protocol that is used for creating, modifying, and terminating sessions with one or more participants. These sessions can include Internet telephone calls, multimedia distribution, and multimedia conferences. SIP clients use Transmission Control Protocol (TCP) or User Datagram Protocol (UDP) to connect to SIP servers and other SIP endpoints. H.323 defines the protocols that provide audio-visual communication sessions on any packet network; and is commonly used in VoIP and IP-based video-conferencing.

Media streams may be sent using the Real-time Transport Protocol (RTP). RTP helps to ensure that packets get delivered in a timely way. Media streams also involve UDP packets, and are transmitted at regular intervals. Media streams are typically encoded using a speech compression algorithm.

Typically, a call agent handles VoIP call routing for VoIP clients. The call agent typically makes a VoIP call using a destination telephone number. This number can be associated with a client on the same call agent, in which case the call is sent directly to that client. Or, the number might be associated with a client associated with a different agent within the same enterprise. In that case, the call agent sends the call to that agent, using configured rules that define how to route the call. When users within the enterprise communicate with users outside of the enterprise, the call is terminated on a PSTN gateway and routed off to the PSTN. This, however, eliminates many of the benefits of VoIP.

Service providers are now beginning to offer "SIP Trunk" services, whereby an enterprise can connect their calls via a SIP link to the service provider instead of through an enterprise gateway. This technique has many of the same limitations as a direct gateway interconnect, since the service provider typically routes the call to a gateway. Furthermore, SIP trunks are not likely to be much cheaper than time-division multiplexing (TDM) trunks, because there is little business incentive for a service provider to make them more cost effective.

Within enterprises or groups of enterprises, two call agents may connect to each other directly over IP, without requiring an intermediate service provider for voice services. One solution for accomplishing this is to statically configure direct SIP or H.323 trunks between call agent or call manager instances in different enterprises. While this may work for small-scale close-knit communities, it becomes very burdensome for even a few dozen interconnected sites and limits its advantages to VoIP calls within the community. Ideally, VoIP should be as easily interconnected as email—any enterprise should just be able to connect to any other enterprise, without configuration.

Figure 1:
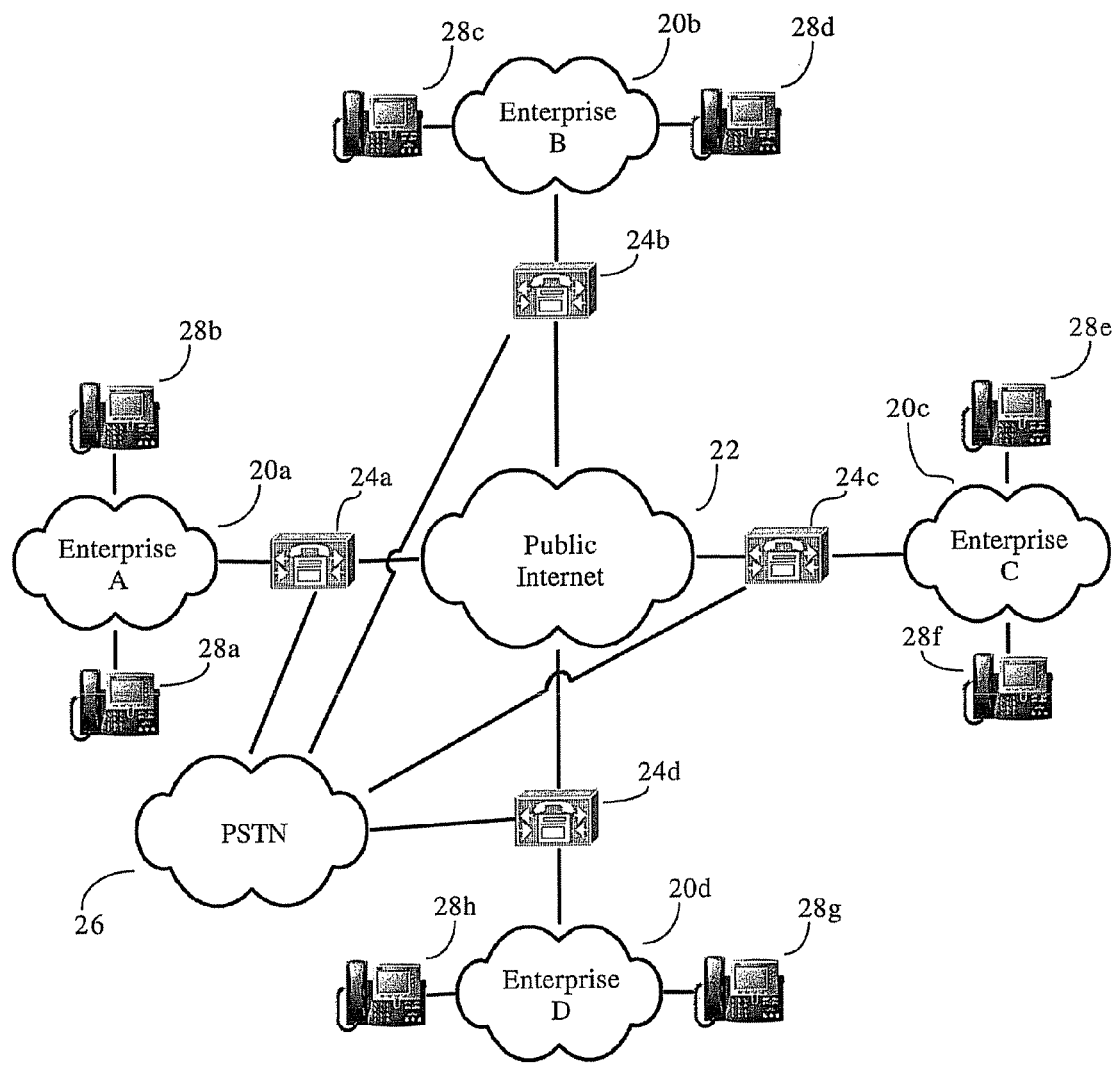
FIG. 1 illustrates example components in a Voice over Internet Protocol (VoIP) network and a Public Switched Telephone Network (PSTN) system.

DESCRIPTION OF EXAMPLE EMBODIMENTS
OVERVIEW

Particular implementations facilitate the exchange and security of VoIP calls over public packet-based communications networks. According to particular implementations, the present invention enables a call agent to use the PSTN system to verify ownership of numbers at another call agent.

As described in further detail below, in one implementation, a call agent claiming ownership to one or more telephone numbers may modify a registry of VoIP call routing information with address blocks containing telephone numbers and/or prefixes in association with a network address of a call agent. This registry is accessible to multiple call agents across a network. The registry may be a maintained in a central repository or in a distributed system, such as a peer-to-peer (P2P) network, where each call agent is a peer operative to exchange VoIP call routing information with other peers.

The registry may include a hash-based access mechanism to protect unfettered access to the VoIP call routing information. For example, instead of each entry of the registry including a telephone number or prefix (or block of telephone numbers) stored unencrypted, the entry contains a hashed value of each telephone number or prefix. To create an entry in the registry, a call agent may hash each of its claimed telephone numbers and prefixes and place each into the registry. Similarly, an originating (calling) call agent, responsive to a call initiation message identifying a destination telephone number, may determine the IP address of a destination call agent by hashing the destination telephone number and looking it up in the registry. In one implementation, the originating call agent searches the registry for a matching entry, where a matching entry would contain an IP address corresponding to the destination call agent. As described in more detail below, the originating call agent may have the destination telephone number, while the hash in the registry may be of a prefix that covers the destination telephone number. Accordingly, in one implementation, if there is not a matching entry for the hashed destination telephone number, the originating call agent may strip the last digit of the number, hash it, and perform another search. The originating call agent may repeat this process until a match is found or until the number of remaining digits is reached to a predefined threshold number.

However, the usage of the registry alone is not sufficient for secure operation of the system. The principle challenge to solve is to be certain that the entries in the registry are correct. In particular, it must be verified that the call agent that has written an entry or series of entries into the registry is truly the "owner" of those numbers. Here, "ownership" implies the property that, had the call actually been routed over the PSTN, it would arrive at that same agent or an agent within the same enterprise. As described in further detail below, in one implementation, an originating call agent may validate ownership of a telephone number by making a PSTN call to the destination call agent claiming to own the telephone number. Both call agents record attributes of the PSTN call. PSTN call attributes may include, for example, a start time, an end time if applicable, a call length, caller ID, and other attributes of the call. Either during or after the call, the originating call agent transmits a request, over IP, for PSTN call attributes to the destination call agent. If the destination call agent had not received the PSTN call, it will not have access to these attributes. Therefore, if it can provide these attributes to the originating call agent, it can demonstrate its ownership of the destination number. Depending on whether the destination call agent responds successfully, the originating call agent may apply an appropriate policy (e.g., store data associated with the verified call agent in the cache so that, for example, future calls can be connected immediately over VoIP, continue the PSTN call, etc.).

As described in further detail below, in one implementation, a destination call agent may verify the caller identification (ID) provided in a VoIP call signaling message sent by an originating call agent by validating the originating call agent against the cache or against the registry. In one implementation, the destination call agent may also verify the caller ID provided by the originating call agent by making a PSTN call to the number provided in the caller ID, where both call agents record the PSTN call attributes. Either during or after the call, the destination call agent transmits, over IP, a request for PSTN call attributes to the originating call agent. Depending on whether the originating call agent successfully responds to the request, the originating call agent may apply an appropriate policy (e.g., display the caller ID or permit the call for a verified call agent, etc.).

As also described in further detail below, in one implementation, the validation of VoIP routes may be separated from the call agent. A validation server—instead of or in addition to the call agent—may validate ownership of a telephone number or otherwise communicate with the registry. The validation server and the call agent may communicate using a validation access protocol (VAP). Using VAP, the call agent may transmit the PSTN call attributes to the validation server. After validating VoIP routes, the validation server may transmit the validated VoIP routes using VAP to the call agent for storage in a cache. When determining whether to initiate a call to a destination telephone number over a VoIP network or over the PSTN, the call agent may search the cache for a corresponding validated route that matches the destination telephone number. If the call agent finds a corresponding validated route, then the call agent may initiate the call over the VoIP network. If the call agent fails to find the corresponding validated route, the call agent may initiate a call over the PSTN.

The present invention is defined by the following claims, and nothing in this section should be taken as a limitation on those claims. Further aspects and advantages of the invention are discussed below in conjunction with the example embodiments.

Example Embodiments

FIG. 1 illustrates an example network environment including a packet-switched communications network, supporting a Voice over Internet Protocol (VoIP) network, and a Public Switched Telephone Network (PSTN) system. In a specific embodiment of the present invention, the system includes enterprise networks 20*a*, 20*b*, 20*c*, and 20*d* that are operably coupled to a public Internet 22. The enterprise networks 20*a*, 20*b*, 20*c*, and 20*d* include respective call agents 24*a*, 24*b*, 24*c*, and 24*d* that are also operably coupled to a PSTN network 26. Each of enterprise networks 20*a*, 20*b*, 20*c*, and 20*d* are also operably coupled to one or more clients 28*a*-28*h* over the respective enterprise networks.

A call agent 24, may be any component configured to receive call control protocol messages. Alternatively or in addition, the call agent 24 may be any component configured to transmit call control protocol messages. A VoIP call agent, may be any call agent 24 configured to receive VoIP call control protocol messages. Alternatively or in addition, the VoIP call agent may be any call agent 24 configured to transmit VoIP call control protocol messages. Examples of a VoIP call control protocol include Session Initiation Protocol (SIP), H.323 Protocol, or any other suitable signaling protocols. In one implementation, a call agent 24 may be an IP-PBX hosting call manager application, such as Cisco Call Manager (CCM), or any node hosting VoIP call manager functions. In another implementation, the call agent 24 may be an IP to IP gateway, such as a Session Border Controller (SBC) or Back-to-Back User Agent (B2BUA) connected to an existing TDM PBX, IP PBX, or other voice or voice over IP equipment. In another implementation, call agent 24 may be a firewall or border router at the edge or near the edge of the IP network 20. In yet another implementation, the call agent 24 may be a softswitch. In one implementation, the call agents 24 may perform the processes described below, including functionalities directed to accessing registries of VoIP call routing information, making and receiving PSTN and VoIP calls and verifying other call agents. In particular implementations, call agents 24 may possibly have media gateway functionalities. In one implementation, a client 28 may be a phone operably connected to a network or directly to a call agent 24. Alternatively or in addition, the client 28 may be a VoIP client.

A call agent 24, when implemented on an IP-PBX, may switch calls between VoIP clients 28 on local lines while allowing all VoIP clients 28 to share a certain number of external PSTN network phone lines. The call agent 24 may also switch calls between a VoIP user and a traditional telephone user, or between two traditional telephone users in the same way that a conventional PBX does.

In particular implementations, the call agents 24 are operative to connect through the public internet 22 to form a P2P network for the purpose of maintaining a distributed registry of VoIP call routing information. In another implementation, call agents 24 all access a centralized or hierarchically structured common store, such as a database Domain Name System (DNS) servers for the purpose of storing and accessing the registry of VoIP call routing information. In one implementation, each call agent 24 is operable to maintain and access a cache, where the cache may be a local cache that resides in the call agent 24 or may be external to but accessible by call agents 24 of the P2P network. As discussed below, the local cache contains validated VoIP call routing information. Each call agent 24 is also operable to access a registry of VoIP call routing information. A given call agent 24 may access its cache or the registry to store or to look up VoIP call routing information of other call agents to make VoIP calls, as well as to verify other call agents.

A PSTN 26 is a circuit-switched network, comprising all or a subset of the world's public circuit-switched telephone networks. The PSTN may include partial fixed-line analog telephone systems, and partial digital telephone systems, as well as mobile telephone systems. An advantage of utilizing the PSTN 26 is that it may operatively connect many enterprises in the world that have PSTN connectivity and possibly caller ID and connected party ID.

Figure 2:
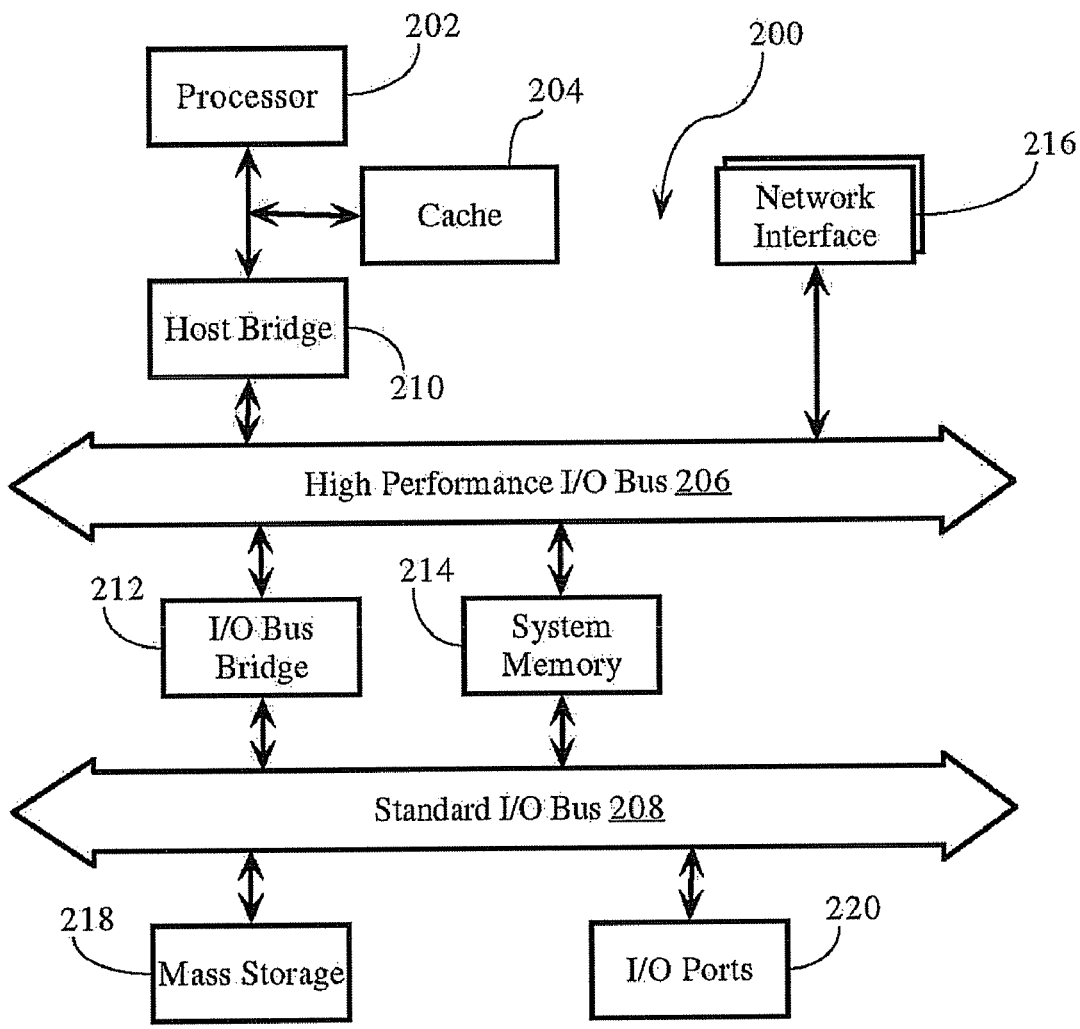
FIG. 2 illustrates for didactic purposes a hardware system, which may be used to implement an Internet Protocol Private Branch Exchange (IP-PBX) or other host of call agent or call manager functionality.

FIG. 2 illustrates for didactic purposes a hardware system 200, which may be used to implement a call agent host, such as an Internet Protocol Private Branch Exchange (IP-PBX). In one implementation, hardware system 200 comprises a processor 202, a cache memory 204, and one or more software applications and drivers directed the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures, and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations a single bus may exist with the components of hardware system 200 being coupled to the single bus. Furthermore, hardware system 200 may include additional components, such as additional processors, storage devices, or memories.

As discussed above, in one embodiment, the operations of the gateway or call manager described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, other embodiments of the present invention may be used with other suitable operating systems, such as the Apple Macintosh Operating System, available from Apple Computer Inc. of Cupertino, Calif., UNIX operating systems, LINUX operating systems, and the like.

In one embodiment, VoIP call routing information is maintained in a registry accessible to one or more call agents 24. In one implementation, the registry may be discoverable and publicly accessible. In one embodiment, the VoIP call routing information may include a set of entries, each including a telephone number or a prefix that represents a range of telephone numbers (or a set of telephone numbers or prefixes). For example, a given enterprise may own the telephone number +1-408-876-5432 and an address block of telephone numbers +1-973-952-5000 through +1-973-952-5999. As such, the call agent 24 of the enterprise may create two entries and would register, for each, a mapping that associates its identity with the number or prefix. In one implementation, the key for the mapping is the number or prefix of the number, including the digits only. In the example above, one key would be 14088765432, and the other would be 19739525. As such, in one implementation, each call agent may register blocks of telephone numbers that it owns by treating the prefix as a number and entering it in the registry. The identity information may include a network address (e.g., IP address, port number, hostname, etc.) or any other type of information that identifies a call agent.

In one embodiment, participation in the P2P network may require the call agent to have a predefined minimum number (e.g., a few dozen) of TCP connections to other nodes in the network. Those connections may be established dynamically, with the peers learned through the P2P protocols. In one implementation, registration into the P2P network may involve running an algorithm to select a peer to which a write operation should take place. That peer, in turn, passes the write onto another peer, and so on. This results in the data being stored and distributed across the call agents participating in the P2P network.

As discussed above, the registry of VoIP call routing information may include a hash-based mechanism protecting against unfettered access to the registry. That is, the telephone numbers or prefixes in the registry entries are hashed values. To store an entry in the registry, a call agent may first hash its associated phone number or prefix before storing it in the registry in association with its identity. The call agent may hash the telephone number or prefix using any suitable hash algorithm, such as MD5 and SHA1. Generally, a strong hash function should be used to ensure that the hashed value is unique to a given telephone number or prefix. By hashing the prefix or phone number, a given call agent may advertise number blocks in a secure manner. For example, using hashed telephone numbers or prefixes prevents telemarketers, spammers and spitters (VoIP spammers) from simply collecting telephone numbers from the registry. A user would need to know the correct telephone number first before attempting a successful search of the registry for VoIP call routing information. Otherwise, it would be computationally expensive (because of the computing resources required to compute the hash) to attempt to learn a significant amount of the VoIP call routing information maintained in the registry by repeatedly selecting a telephone number or prefix, computing a hash value and looking it up against the registry.

Topologically, the registry of VoIP call routing information may be maintained in a variety of ways. In one implementation, the registry may be maintained using a P2P network. The P2P network may be made up of all or some of the call agents in the system, or the registry can be maintained in a different P2P network, accessed by all of the call agents in the system. When a P2P network is utilized, each node in the P2P network (which may be the call agents), will end up maintaining a subset of the information in the registry, depending on the P2P protocols that are in use. Any suitable P2P protocol or technique may be used, including Chord, CAN, Bamboo, Kademlia, and so on.

In some embodiments that utilize a centralized registry system, a central server may maintain the registry, where the registry may be a central repository accessible by one or more call agents. In one embodiment, a given call agent may send a phone number or prefix to a central data store, and the central data store will store it. Other call agents may query the central data store, and retrieve the mapping from the phone number to the identity of the call agent. In another embodiment, the central registry may hash the phone number or prefix and store the hashed phone number or prefix in the registry.

In some embodiments that utilize a hierarchical registry system, such as the domain name system (DNS), a given call agent may transform the phone number or prefix into a hierarchical identifier, for example, by utilizing a telephone number mapping protocol, such as the Electronic Numbering (ENUM) protocol defined by the IETF in RFC 2916. The call agent may then use this identifier to write the VoIP call routing information into the hierarchical system at the appropriate location. The servers in the hierarchy may be the same as the call agents, or different. If the DNS is used as the hierarchical system, this may be a public DNS or a private DNS.

In some embodiments, a given call agent may receive a telephone number in a call initiation message from an originating client or an originating call agent, and then use the telephone number to lookup VoIP call routing information in the registry. In one embodiment, the call agent may search the registry for each of the N−1 prefixes of the N-digit destination number. Searches may be based on exact matches, as opposed to hierarchical matches. In other words, one address block should be found, and if more than one address block is found, the most specific one is used. Assuming there is a matching entry in the registry, the identity of the terminating call agent for that number or number block (which includes the IP address and port number of the destination call agent) that was found may be cached to avoid queries in the future.

Figure 3:
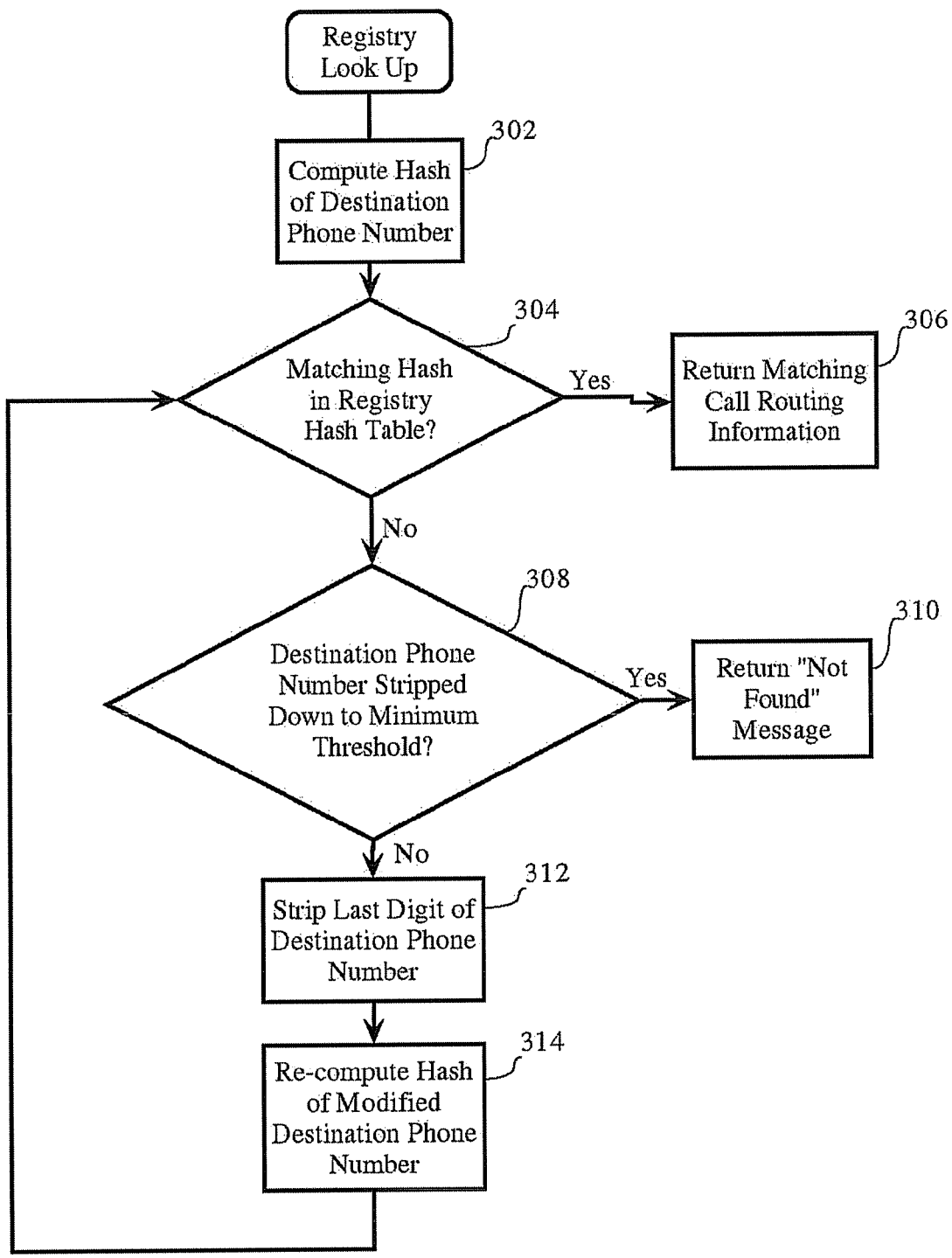
FIG. 3 illustrates an example process flow implemented at an originating call agent and associated with looking up an address block in a registry of VoIP call routing information.

In particular embodiments, where the registry stores hashed telephone numbers or prefixes, a look up process implemented on a call agent may perform the following operations in order to look up VoIP call routing information. FIG. 3 illustrates an example process flow implemented at a call agent directed to looking up VoIP call routing information in the registry. Responsive to some event (such as receiving a call initiation message identifying a telephone number), the look up process computes a hash of an identified telephone phone number (302). The look up process then accesses the registry and determines if there is a matching entry, or specifically, if the hashed telephone number matches (based on an exact string match) any hashed numbers in the registry (304). If so, VoIP call routing information corresponding to the matching entry is returned (306) and possibly used in some other process implemented by the call agent. For example, in one embodiment, the IP address of the destination call agent corresponding to the telephone number may be used to route a VoIP call.

If there is no matching entry, the look up process determines if the telephone number is stripped to a minimum threshold number of digits (308). In one embodiment, the minimum threshold may be a predefined number of digits. For example, the minimum threshold number may be 1 digit (e.g., the smallest country code possible). If the telephone number is stripped to a minimum threshold number of digits, the look up process returns a "not found" message (310). The call agent 24 may respond to this message in a variety of manners depending on the context. For example, in one implementation, an originating call agent may attempt to make a PSTN call or may deny the call, optionally notifying the originating client of the call denial and optionally providing a reason for denying the call.

If the destination phone number is not stripped to a minimum threshold number, the look up process strips the last digit of the telephone number (312). The originating call agent then re-computes the hash of the modified telephone number (314) and determines if the re-computed hashed telephone number matches any hashed telephone numbers in the registry (304). The call agent may continue this process until a matching entry is found or until the destination phone number has been stripped down to the minimum threshold number.

This process provides security to the system, because without a legitimate phone number, it would be computationally expensive to acquire phone numbers. In one embodiment, policies may be applied to detect suspicious nodes that transmit queries that result in greater than a threshold number of failures over a sliding window of time.

As described in more detail below, a given call agent may use the facilities of a PSTN to validate VoIP call routing information in the registry. For example, a call agent may verify that another call agent can legitimately claim ownership of a telephone number it wrote into the registry. Here, "ownership" may imply the property that, had the call been made over the PSTN, the call would have been routed to the call agent which wrote the entry into the registry, or if not that call agent, another call agent under the same administrative control. For example, a call agent, responsive to an identified telephone number, may make a PSTN call to that telephone number over PSTN 26. Generally, if the call agent claiming ownership of the destination telephone number is authentic, it will receive the PSTN call over PSTN 26 and will thus have an opportunity to record one or more attributes of the PSTN call, such as start time, end time, calling party identifier, and the like. The PSTN call attribute information can be used as a shared secret to allow the first call agent to validate the other call agent. As described in more detail below, verification of a call agent may occur during or after a PSTN call.

In the implementation described below, a given call agent may store verified VoIP call routing information in a local cache. The call agent, responsive to a call initiation message identifying a destination telephone number, may selectively place a PSTN or VoIP call to a given destination telephone number depending on the presence, or absence, of validated VoIP call routing information in the cache that corresponds to the destination telephone number. Matching validated routing information in the cache generally means that the terminating call agent has been verified. The originating call agent may then place a VoIP call by transmitting a call initiation message to the terminating call agent. If no validated match is found in the cache, but the number is in the cache as a consequence of a previous query to the registry, the call agent may place a PSTN call and validate the call agent. If no match is found in the cache at all, the call agent may query the registry for the number as described above, in addition to placing a PSTN call.

Figure 4:
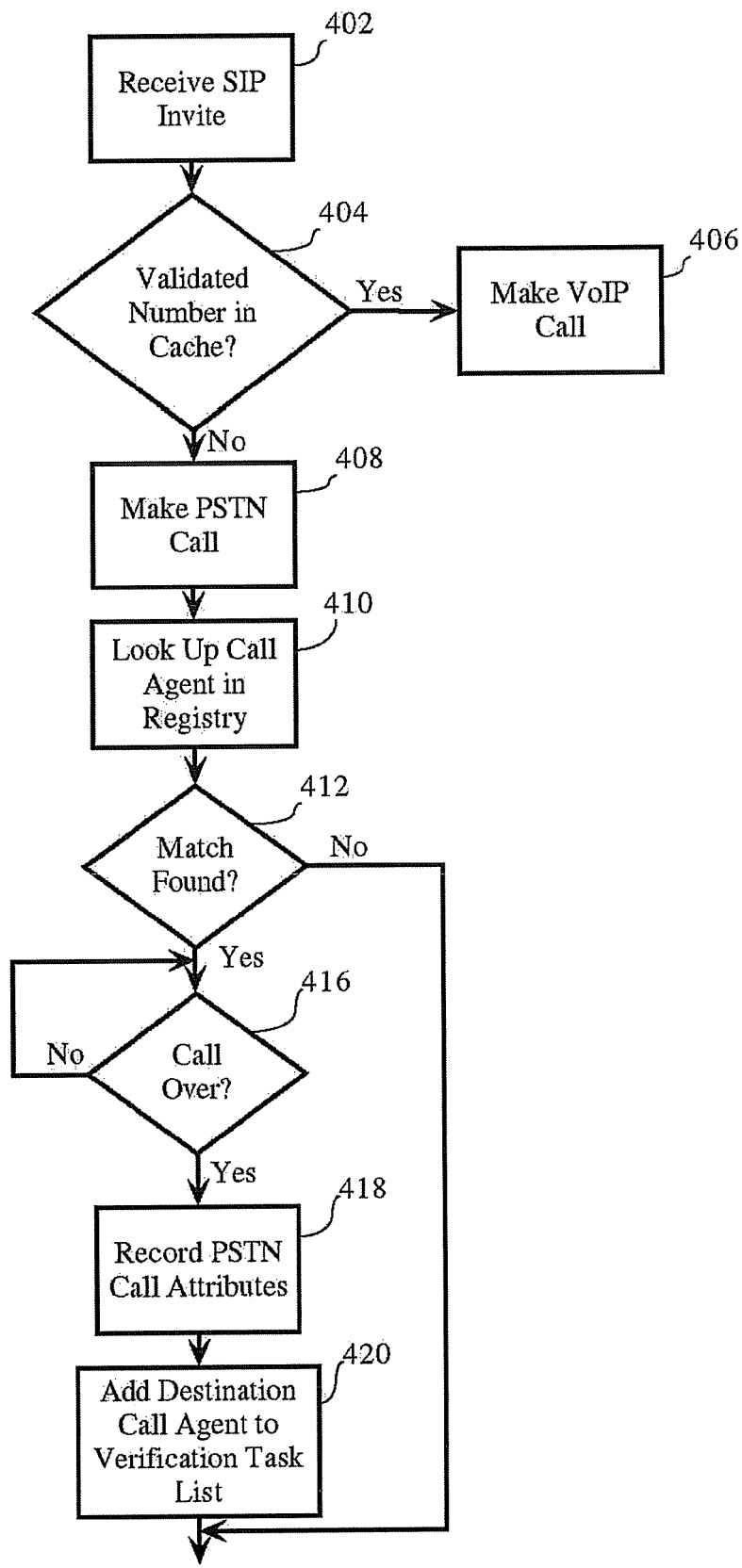
FIG. 4 illustrates an example process flow implemented at an originating call agent to determine whether to make a PSTN or VoIP call in response to a call initiation message.

FIG. 4 illustrates an example process flow implemented at an originating call agent directed to selectively placing a PSTN or VoIP call responsive to a call initiation message from a calling node. As FIG. 4 shows, the process begins when the originating call agent (e.g., call agent 24*a*) receives a call initiation message, such as a SIP invite, from an originating (calling) node (e.g., client 28*a*) (402). In one embodiment, the call initiation message includes a destination telephone number.

The originating call agent accesses its cache to determine if there is a matching validated cache entry, whereby the cached address block is associated with the destination number, and the destination number has been validated previously (404). If there is a matching validated entry in the cache, the originating call agent makes a VoIP call, transmitting signaling messages to the terminating call agent associated with the matching address block in the local cache (406). This signaling message can be sent directly to the destination call agent, or can be sent through intermediate servers or providers.

If there is no matching validated address block in the cache, the originating call agent makes a PSTN call to the destination telephone number (408). As FIG. 4 shows, the originating call agent may also look up, using the telephone number, the terminating call agent in the registry (408), if the destination number is not in the cache at all. More specifically, in one embodiment, the originating call agent may use the destination phone number to look up VoIP call routing information of the destination call agent in the registry (see Section C, above). If a matching entry is found (412), the originating call agent may record one or more attributes of the PSTN call to be used in a subsequent verification process. In the implementation shown, the originating call agent, after the PSTN call ends (416), records one or more PSTN call attributes in a data store (e.g. a called-out database) (418), and adds the terminating call agent to a verification task list (420). In one implementation, the data store may be a temporary data store that stores the information for a period of time, or it may be a database with persistent storage. In another implementation, the PSTN call attributes can be recorded for every call, and then the registry can be queried as part of the procedures followed when executing the verification task list.

A variety of PSTN call attributes can be stored. In one implementation, the PSTN call attributes may include a PSTN call start time, a PSTN call stop time, call length (e.g., how long the call lasted), a caller ID of the calling client, and any other information that the originating VoIP network may be used to verify that the destination received the PSTN call. Other PSTN call attributes may include signatures of the voice data as computed by the originating and terminating gateways. For example, the call agents may compute the amount and start times of silent periods during a call, or a spectral signature of the voice data during the call. Other PSTN call attributes may include a sequence of DTMF tones that the originating gateway may transmit during some point in the call (e.g., just prior to call termination).

One advantage of the implementations describe herein is that they may be used with telephone numbers. Another advantage is that implementations described herein are undetectable by service providers. Because enterprises may still make PSTN calls, implementations described herein may reduce the volume of such PSTN calls.

Furthermore, other implementations are possible. For example, even if matching VoIP call routing information is found in the cache, the originating call agent (according to some randomized or other process) may nevertheless select the entry for re-validation, causing the call agent to make a PSTN call and to add the call agent to a verification list. Still further, call agent may apply an aging algorithm to its cache to flush old entries.

Figure 5:
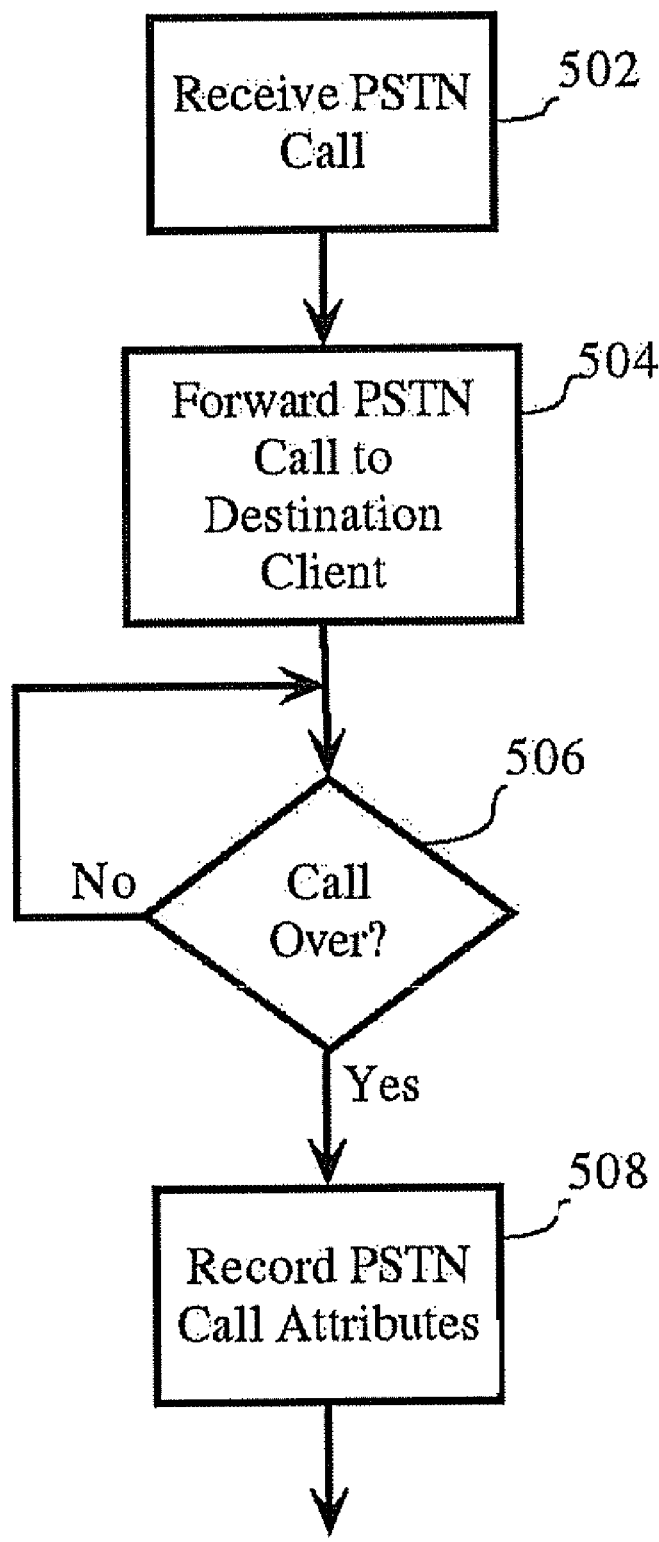
FIG. 5 illustrates an example process flow implemented at a destination call agent responsive to receiving a PSTN call.

FIG. 5 illustrates an example process flow implemented at a destination or terminating call agent directed to recording one or more attributes associated with a received PSTN call. To allow for verification, a terminating gateway may record one or more attributes of a PSTN call in order to successfully answer queries from the originating call agent. As FIG. 5 illustrates, the destination call agent receives a PSTN call (502) and then forwards the PSTN call to the destination client (504). After the call ends (506), the destination call agent records the PSTN call attributes in a data store (e.g. a called-in database) (508). In one implementation, the data store may be a temporary data store that stores the information for a period of time. The foregoing section identifies example PSTN call attributes that the terminating call agent may record.

If the originating call agent performs the verification after the PSTN call, the originating call agent may perform the verification at various times depending on the specific implementation. For example, the originating call agent may perform verification immediately after the PSTN call. In other implementations, the originating call agent may verify multiple destination call agents in a batch process run at off-peak periods. In one implementation, the originating call agent may verify the destination call agent at a random time after the call is completed. The originating call agent may perform one or more verification operations upon a triggering event such as when receiving a new call initiation message.

As described in more detail below, the verification may be a knowledge-based verification, where the originating call agent queries the destination call agent for PSTN call attributes corresponding to one or more prior PSTN calls. The PSTN call attributes may be conceptualized as "shared secrets" that only those two call agents would know.

Figure 6:
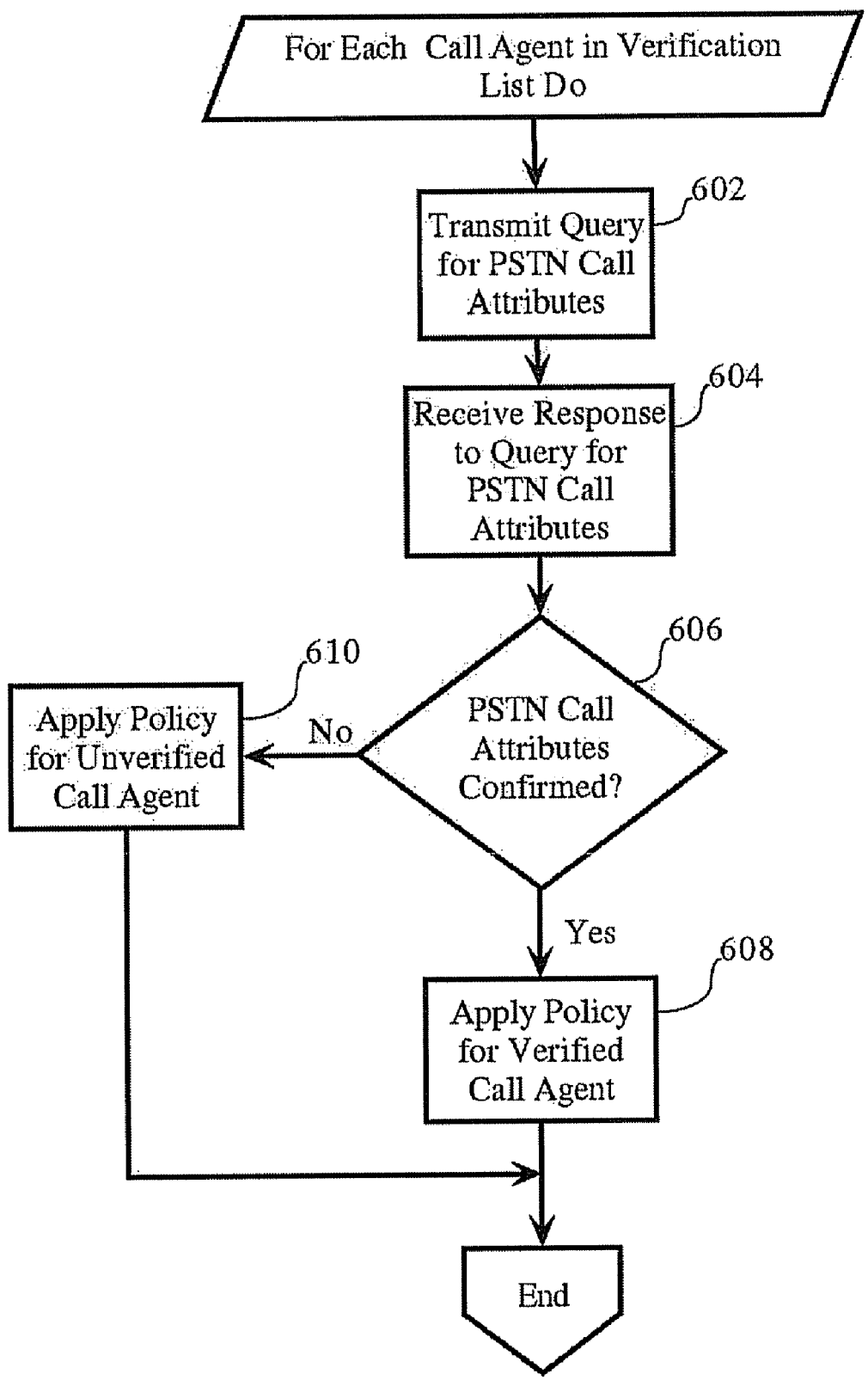
FIG. 6 illustrates an example process flow implemented at an originating call agent and associated with verifying a destination call agent.

FIG. 6 illustrates an example process flow implemented at the originating call agent and associated with verifying the destination call agent. As FIG. 6 shows, for each destination call agent in the verification list, the originating call agent transmits a query for PSTN call attributes to the destination call agent (602). The query may be transmitted over a packet-based communications network using the IP address and port of the destination call agent learned from the registry.

The call agents may communicate according to a variety of different protocols. For example, in one implementation, the "called-in" database maintained by a destination call agent may be accessible to a verifying call agent by using a directory access. The originating call agent may send a query using the destination phone number as a key, and the terminating agent would return the recorded PSTN attributes for calls with that destination phone number. Any number of protocols can be used for this purpose, including standard database and directory protocols, such as LDAP and SQL, or HTTP queries, SOAP queries, or any other suitable technology for querying for a piece of data and getting a response.

In an alternative implementation, an actual authentication protocol can be used to improve security. In this implementation, the PSTN call attributes are mapped to a username and password, and then a traditional authentication or login protocol can be used to verify the data. For example, the user name may be the destination number and start time of the PSTN call, and the password may be the stop time of the PSTN call. As another example, the username can be the destination number and a random time in the middle of the call, and the password can be the start and stop times of the call. As another example, the username can be the destination number and caller ID, and the password can be the start time and stop time of the call. In one implementation, the PSTN call attributes may include information associated with the content of the PSTN call. For example, during a given PSTN call, both the originating and destination call agents may execute a silence detection algorithm to detect silence and talking. The VoIP may then generate a PSTN call signature or fingerprint based on the detected silence and talking patterns. This fingerprint or signature can be used as part of the username and/or password. For example, the username could be the destination number and start time of the call, and the password could be the fingerprint. Or, the username could be the destination number and signature over the first half of the call, and the password is the signature over the second half.

In one implementation, the PSTN call attributes may include a call signature or fingerprint. In one implementation, the originating call agent may execute frequency spectrum analysis or speech recognition algorithms to generate the call signature or fingerprint. In one implementation, the originating call agent may, prior to the end of the PSTN call, send a random string using dual-tone multi-frequency (DTMF) values that both call agents record. The call signature or fingerprint may then include the DTMF bits. In one implementation, the query may provide the destination call agent minimal information such as the call start time. Based on the limited information, the destination call agent may ascertain the appropriate information to provide.

When the originating call agent receives a response to the query for PSTN call attributes (604), the originating call agent determines if the PSTN call attributes are confirmed (606). In one implementation, the PSTN call attributes are confirmed if the PSTN call attributes in the response from the destination call agent match the PSTN call attributes that the originating call agent stored in the "called out" database. In one implementation, when an authentication or log-in protocol is utilized, the PSTN call attributes are confirmed if the log-in or authentication protocol succeeds. In one implementation, the authentication protocol may function without transmitting the PSTN call attributes from either call agent during authentication. For example, the authentication protocol may be based on an Encrypted Key Exchange (EKE) protocol that provides zero-knowledge password proof. In one implementation, the validation may fail due to a given PSTN call being forwarded to an illegitimate call agent.

If the PSTN call attributes are confirmed, the originating call agent applies an appropriate policy for verified destination call agents (608). For example, the originating call agent mark the entry in the cache for this number as being validated, resulting in future VoIP calls subsequently being made to that call agent, as discussed above. That is, if the VoIP routing information is validated for the first time, the originating call agent will find a matching entry in the cache the next time, and will thus able to make a VoIP call to the now verified call agent. As such, no subsequent search to the registry would be necessary.

Furthermore, the verifying call agent may establish a connection to the verified call agent for routing of VoIP call initiation messages. In one implementation, once a Transmission Control Protocol (TCP)/Transport Layer Security (TLS) connection is established, the originating call agent may send an SIP invite directly to the destination call agent. In one implementation, a given call agent may maintain multiple TCP/TLS connections up to a predefined number (e.g., 1,000 connections), after which the call agent may terminate an inactive or the least active connection.

If the PSTN call attributes are not confirmed, the originating call agent applies an appropriate policy for unverified destination call agents (610). For example, the originating call agent may log the verification failure in the cache, generate an alert message, add the call agent to a black list and the like, etc.

Implementations of the verification process may be optimized in a variety of ways. In one implementation, even if a given phone number or prefix is stored/validated in the cache, the verification may be augmented to cause a revalidation. For example, in one implementation, the originating call agent may randomly select some calls to re-verify that the destination call agent still owns the particular phone number of phone number block. In one implementation, the originating call agent may re-verify a predefined percentage of the calls (e.g., 5%) or a random number of calls. In another implementation, the call agent may timeout the validation after a configured period of time, for example, one month, so that re-verification is performed once a month.

In another optimization, when a particular number in a block has been verified, other numbers in that same block can also be considered verified. For example, if number A and number B within a block have been verified, the call agent can consider all numbers between A and B within that block to also be verified. In one implementation, this automatic verification can happen only when numbers A and B are close to each other, for example within 1000 numbers.

In another implementation, the shared secret may be defined based on the last N PSTN calls, improving the security of the mechanism. In one embodiment, instead of basing the PSTN call attributes on the last N calls between any two telephone numbers in a given block, the PSTN call attributes may be based on the last N calls between specific telephone numbers. In one implementation, if the originating call agent may validate a predefined number or predefined percentage of telephone phone numbers of a given address block (e.g., 2 out of 50 telephone numbers, or 4%), the originating call agent may accept the remaining telephone numbers of the address block for future calls.

In one implementation, if the destination call agent is verified before the PSTN call ends, the originating call agent may optionally permit the PSTN call to continue even with the successful verification. As such, the VoIP call may be used for enhanced features on top of the voice portion of the calls (e.g., the PSTN call). For example, the originating call agent may use the PSTN call for voice and use the VoIP call for enhanced features such as video, sound, presence, Instant Messaging (IM), and/or data applications.

Accordingly, implementations provide advantages such as preventing call agents from claiming ownership to a telephone number that they actually do not own. Also, implementations do not require any special PSTN configurations.

Figure 7A:
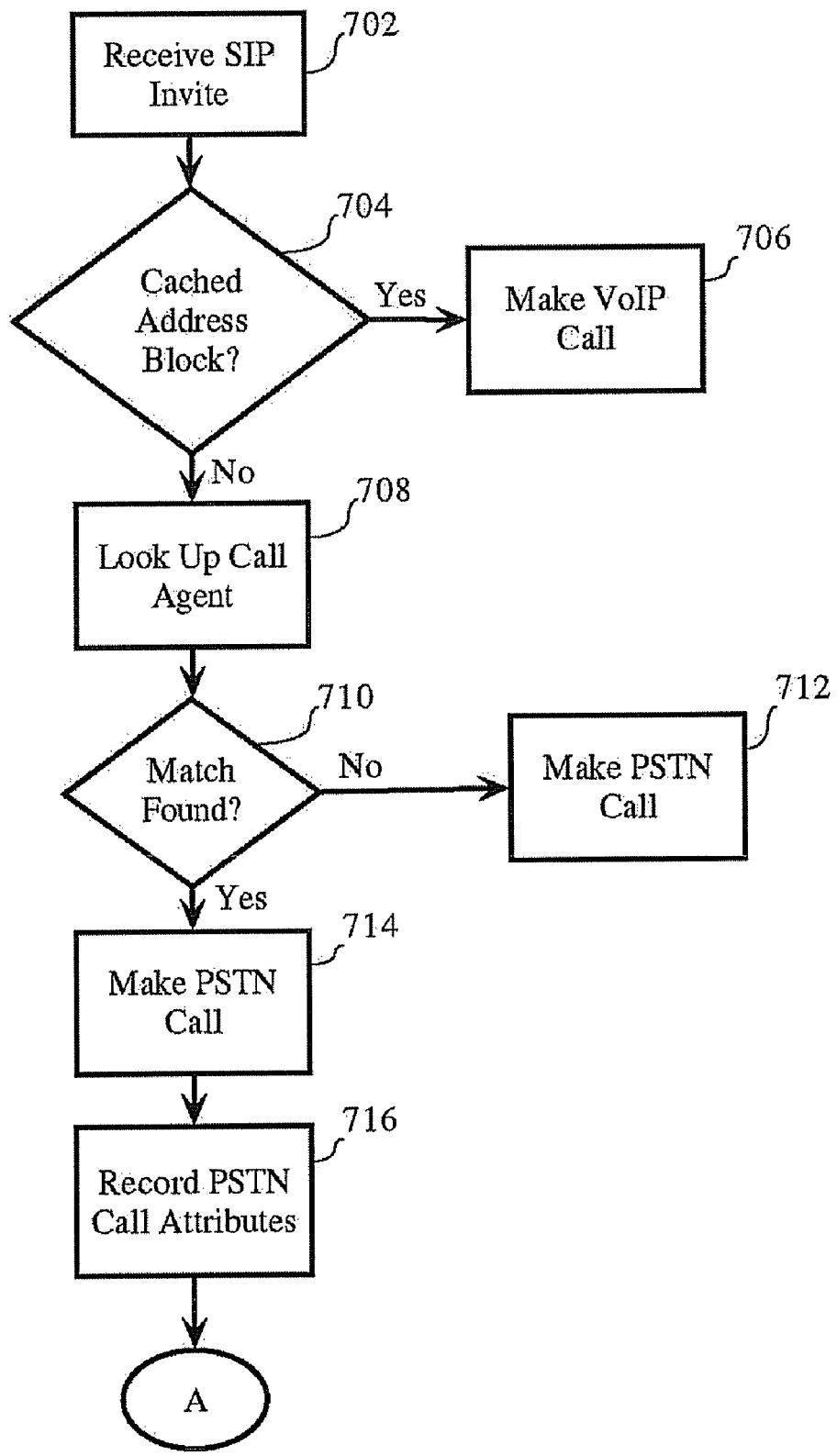
FIGS. 7A and 7B illustrate an example process flow implemented at an originating call agent and associated with verifying a destination call agent during a PSTN call.
Figure 7B:
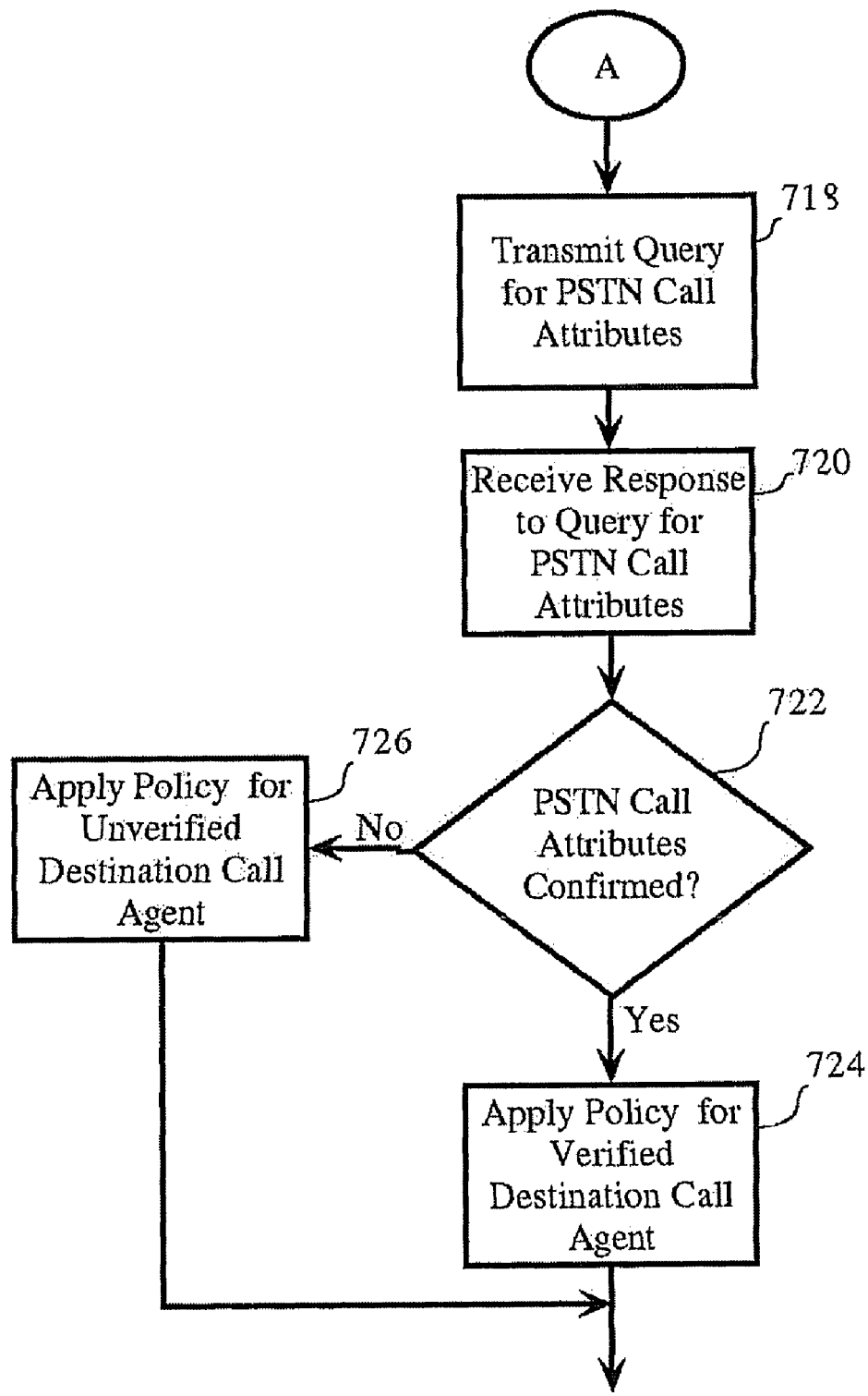

FIGS. 7A and 7B illustrate an example process flow implemented at the originating call agent directed to verifying the destination call agent during a PSTN call. As FIG. 7A shows, the process begins when the originating call agent receives a call initiation message such as a SIP invite from an originating client (702). In one embodiment, the call initiation message includes a destination telephone number.

The originating call agent accesses its cache to determine if there is a validated matching entry with an address block associated with the destination number (704). If so, the originating call agent makes a VoIP call (706).

If there is not a matching validated entry in the cache, the originating call agent looks up the destination call agent in the registry (708). If a match is not found (710), the originating call agent makes a PSTN call (712).

If a match is found (710), the originating call agent still makes a PSTN call (714) and also performs the following steps. The originating call agent records the PSTN call attributes in a data store (e.g. a called-out database) (716). As described above, in one implementation, the data store may be a temporary data store that stores the information for a period of time. In one implementation, the PSTN call attributes may include a PSTN call start time, a caller ID of the destination client, voice signature information (such as spectral analysis or silence/activity periods), DTMF, and any other information that the originating call agent may use to verify that the destination call agent is connected during the PSTN call.

Referring to FIG. 7B, while the PSTN call is still in progress, the originating call agent transmits a query for PSTN call attributes to the destination VoIP (718). In particular implementations, the query may request that the destination call agent provides similar information as the query described above in connection with step 602 of FIG. 6, except that the PSTN call attributes would not include a call stop time or a call length, as the PSTN call would still be in progress.

In one implementation, when the destination call agent receives a PSTN call, the destination call agent forwards the PSTN call to the destination client, and records the PSTN call attributes in a data store (e.g. a called-in database). Upon receiving the query for PSTN call attributes, the destination call agent sends a response. When the originating call agent receives the response to the query for PSTN call attributes (720), the originating call agent determines if the PSTN call attributes are confirmed (722). If the PSTN call attributes are confirmed, the originating call agent applies an appropriate policy for verified destination call agents (724). For example, the originating Call agent may cache the VoIP call routing information, so future calls may go over VoIP. Or, it may transfer the PSTN call in-progress to a VoIP call. If the PSTN call attributes are not confirmed, the originating Call agent applies an appropriate policy for unverified destination call agents (726). For example, the originating call agent may log the verification failure in the cache, generate an alert message, end the call, etc.

In one embodiment, if an attacker claims a telephone number that the attacker does not actually own, no call will ever be made to the attacker over VoIP, because the terminating call agent of the attacker would not be able to successfully respond to a query for PSTN call attributes, since the PSTN call would have gone to the actual owner of the telephone number.

In one embodiment, if an attacker claims ownership to a larger prefix than the attacker actually owns, the attacks may not be detected initially but would probably be detected. This is because some of the calls can be expected to be made over the PSTN, thereby assuring that the falsified numbers are eventually tried and detected. In one implementation, an enterprise may require that a PSTN call be made at least once to any particular destination telephone number. While this may cause more PSTN calls to be made, it would eliminate such attacks.

Because the registry is not used at the initial call setup time, any latency has no impact on call setup delays. Indeed, call setup times using implementations disclosed herein will be faster than even over the PSTN, because the originating call agent communicates directly with the destination call agent. In many cases, not even a Transmission Control Protocol (TCP) connection setup is required, because such a connection may have already been established and maintained as a consequence of a previous call to that terminating call agent.

However, in another implementation, when a PSTN call arrives at the terminating call agent, the terminating call agent holds the call and does not deliver it yet to the terminating client. Rather, it examines the caller ID from the PSTN call setup message, and queries the registry for this number. If a match is found, the terminating call agent further holds the call in anticipation of receiving a request to verify the PSTN call attributes. Once this validation has succeeded, the originating call agent can place a VoIP call, and the terminating call agent can reject the PSTN call and proceed with the VoIP call. This eliminates the need for a PSTN call to actually be completed, but increases call setup delays as a consequence.

Furthermore, implementations disclosed herein are fail-safe in that the originating call agent may make PSTN calls even when the destination call agent is verified against the cache or against the registry. In other words, even if a given originating call agent crashes and recovers, losing its cache, or if the registry is compromised in some way, or any of a number of problems occur, the worst case is that calls still get routed over the PSTN. As such, the end user experiences no disruption in service. Some P2P VoIP overlay network providers need to provide centralized servers that hand out user names within their network and hand out certificates. Because implementations described herein utilize telephone numbers that have already been issued to an enterprise, no such central services are required.

As described in more detail below, the cache maintained by the call agent and the registry may be used to verify caller ID information in received VoIP calls. For example, when a given destination call agent receives a call initiation message over a packet-based communications network (e.g., SIP invite) having an associated caller ID containing a phone number, the destination VoIP may verify the caller ID against the cache of the call agents and/or against the public registry. This provides two levels of validation.

Figure 8:
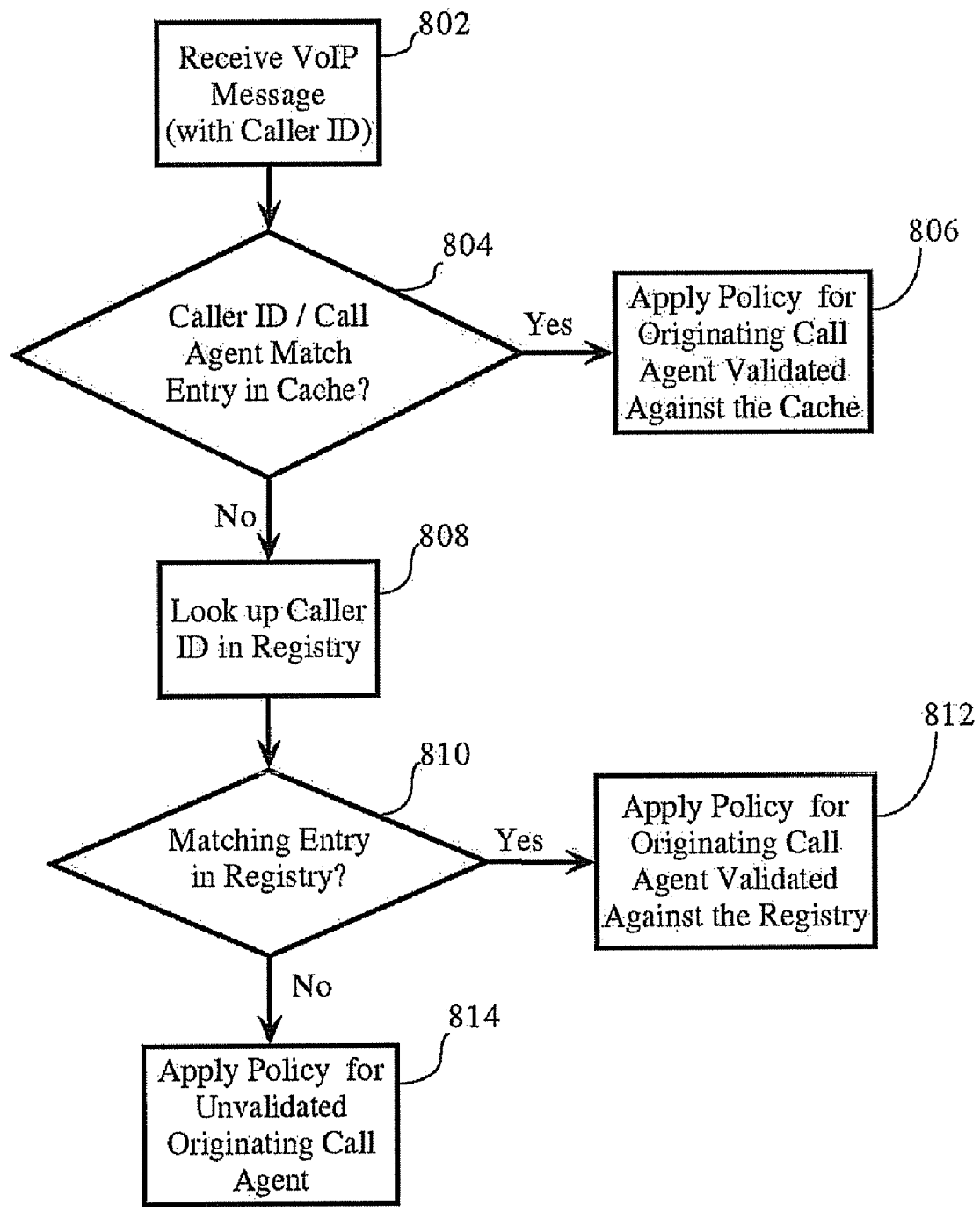
FIG. 8 is a flow chart of operation of one embodiment implemented at a destination call agent and associated with verifying the caller ID in a call initiation message.

FIG. 8 is a flow chart implemented at the destination call agent and associated with verifying the caller ID in a received call setup message. As FIG. 8 shows, the destination call agent receives a call initiation message such as a SIP invite from an originating call agent (802). In one implementation, the call initiation message contains a caller ID. The destination call agent searches its cache for a matching entry to determine if the caller ID matches a phone number in the cache, and whether that number has been verified. If it has been verified, the call agent checks if the identity of the entity sending the call setup request matches the identity of the call agent that was verified (based on matching certificates used in TLS procedures, or based on matching IP addresses, or any other suitable means of comparison) (804). If so, the destination call agent applies one or more policies for originating call agents that are validated against the cache (806). For example, in one implementation, the destination call agent may indicate to the user of the destination client that the sender (originating call agent) is verified. In one implementation, the destination call agent may selectively show the caller ID, or add a symbol or character indicating a valid caller ID. In one implementation, the destination call agent may permit the call, etc.

If the caller ID has not been verified, but matches a number in the cache, or the caller ID does not match any number in the cache, the destination call agent may look for a matching entry in the registry (808, 810). If there is a matching entry in the registry or in the cache, and the identity of the call agent in the registry entry (which may have been cached) matches the identity of the agent that sent the call setup request (based on matching certificates used in TLS procedures, or based on matching IP addresses, or any other suitable means of comparison) the destination call agent applies one or more policies for originating call agents that are validated by the registry (812). Similar to the one or more policies that may be applied in step 806, in particular implementations, the destination call agent may indicate to the user of the destination client that the sender (originating call agent) is verified (and optionally indicate a second level of validation), may show the caller ID, may permit the call, etc. If the caller ID does not match a phone number in the registry, the destination call agent applies one or more policies for unvalidated originating call agents (814). For example, in one embodiment, the destination call agent may indicate to the user of the destination client that the sender is unverified, or may show no caller ID, or may deny the call, etc.

Because a malicious call agent may provide a false caller ID, this process enables a given call agent to provide caller ID information to two levels of verification. As described above, the VoIP may utilize the cache or the registry to verify the caller ID against previous verifications or against an IP address and port number, the former of which cannot be falsified. Accordingly, implementations described herein have an advantage of preventing caller ID spoofing. For example, if an originating call agent of an enterprise launches a SIP call with a fake caller ID, the fake caller ID may match an entry corresponding to a call agent of a different enterprise.

In one implementation, in addition to verifying the caller ID against the cache or against the registry, the destination call agent may also verify the originating call agent according to the verification processes described above in connection with FIGS. 4, 6, 7A, and 7B. As such, an originating call agent using a fake ID would not be able to successfully respond to a request for PSTN call attributes.

In one embodiment, the originating and destination call agents may verify each other based on the same call. For example, in one implementation, the originating call agent may make both a PSTN call and a VoIP call to the destination call agent. When receiving the PSTN call, if the destination call agent determines that the caller ID corresponds to another call agent in the network, the destination call agent holds the PSTN call for predefined time period (e.g., a few seconds). When the VoIP call arrives, mutual authentication is performed. In other words, the originating and destination call agents verify each other as described above. If mutual authentication succeeds, the PSTN call is rejected and the VoIP call proceeds.

This approach provides highly reliable validation of the advertised number blocks in the P2P network, as well as provides a VoIP anti-spam function. In one implementation, if an originating call agent is making too many VoIP calls, even though it is validated, the terminating call agent can reject incoming VoIP calls from that call agent, and redirect it to utilize the PSTN instead. This passes costs onto the originating call agent and therefore helps alleviate VoIP spam.

Also, because this technique uses telephone phone numbers, it may make it difficult for a spammer to change identifiers. Changing identifiers in email is inexpensive and easy, because domains and user IDs within a domain are practically free and in infinite supply. This is not so with telephone numbers, which are a more expensive and a finite resource. Furthermore, because telephone numbers are used, an enterprise that is spamming can be traced back through its service provider. Black lists also become much more effective, because of the finite namespaces of phone numbers.

In one implementation, the validation of VoIP routes may be separated from the call agent. A validation server—instead of the call agent—may validate ownership of a telephone number or otherwise communicate with the registry. The separation may result in: (1) elimination of use of the call agent to connect to the P2P network; (2) a decoupling of the call agent from the details of how VoIP routes are learned; (3) elimination of use of the validation server during the setup of outgoing calls; and (4) the validation server may learn VoIP routes for multiple call agents.

The elimination of the need for the call agent to connect to the P2P network may be desirable. Administrators may be reluctant in some cases to permit the call agent to be connected to the P2P network. Call agents may be considered by administrators to be critical infrastructure. Being connected to the P2P network may require the call agent to process background P2P traffic. Additionally, traffic sent and received on the P2P network may be encrypted. Unlike VoIP traffic, a firewall and/or a session border controller may not be able to monitor the encrypted P2P network traffic.

Figure 9:
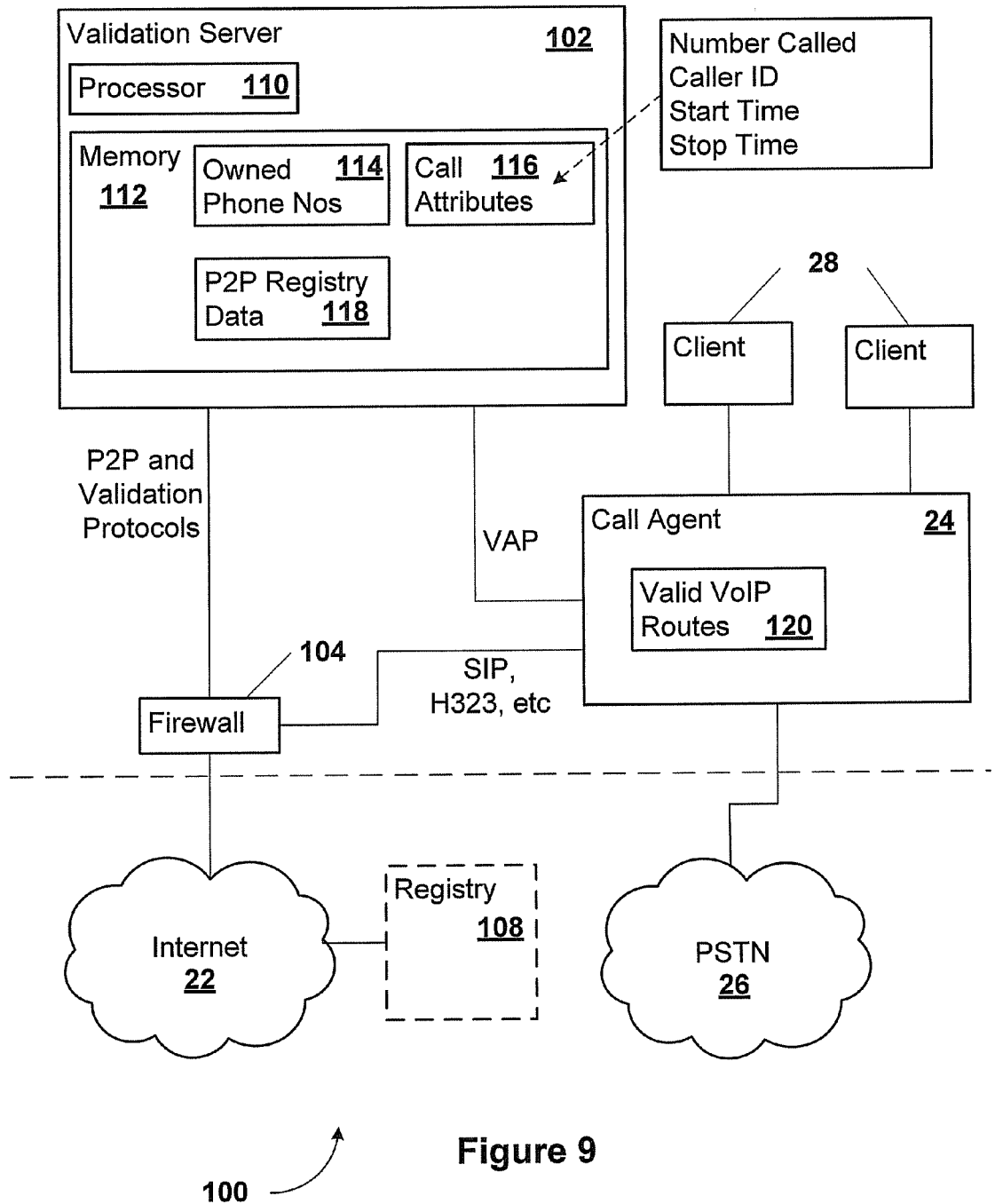
FIG. 9 illustrates an example of a system that separates validation services from the services of a call agent.

FIG. 9 illustrates an example of a system 100 that separates validation services from the services of the call agent 24. The system 100 may include a validation server 102, the call agent 24, a firewall 104, and clients 28 of the call agent 24. The system 100 may include different, fewer, or more components. For example, the system 100 may not include the firewall 104. In one example the system 100 may include just the validation server 102. In a second example, the system 100 may include multiple call agents 24. In a third example, the registry 108 may be stored in the P2P network, which may be maintained in validation server 102, in other validation servers, in other call agents, or in any combination thereof. Alternatively, the system 100 may include the registry 108 as a centralized repository, such as a Telephone Number Mapping (ENUM) server.

The validation server 102 may include one or more processes to validate VoIP routes and communicate with the registry 108. In one example, the validation server 102 may include a processor 110 and a memory 112. In a different example, the validation server 102 may be software without hardware.

The memory 112 may be may be any now known, or later discovered, data storage device. The memory 112 may be a non-volatile and/or volatile memory, such as a random access memory (RAM), a read-only memory (ROM), an erasable programmable read-only memory (EPROM), or flash memory. The memory 112 may include an optical, magnetic (hard-drive) or any other form of data storage device.

The processor 110 may be in communication with the memory 112. The processor 110 may also be in communication with additional components, such as a display. The processor 110 may be a general processor, central processing unit, server, application specific integrated circuit (ASIC), digital signal processor, field programmable gate array (FPGA), digital circuit, analog circuit, or combinations thereof. The processor 110 may be one or more devices operable to execute computer executable instructions or computer code embodied in the memory 112 or in other memory to validate VoIP routes.

The call agent 24 may be in communication with the validation server 102. The call agent 24 may also be in communication with the PSTN 26 and the Internet 22. Additionally, the call agent 24 may be in communication with the clients 28.

In addition to the validation server 102 being in communication with the call agent 24, the validation server 102 may be in communication with the registry 108 over the Internet 22. The firewall 104 may be between the Internet 22 and the validation server 102 and/or between the Internet 22 and the call agent 24.

During operation of the system 100, the validation server 102 may perform validation services and communicate with the registry 108. For example, the validation server 102 may communicate with the registry 108 using the P2P protocol or any other suitable protocol used to communicate with the registry 108. The validation server 102 may also communicate with VoIP agents using an authentication protocol to validate the VoIP agents for a telephone number or for a range of telephone numbers. The validation server 102 may perform P2P functions when the registry 108 is implemented as a P2P network. For example, the validation server may route P2P messages based on finger tables included in a portion of the P2P registry data 118 included in the validation server 102.

The validation server 102 and the call agent 24 may communicate using a validation access protocol (VAP). VAP may be any protocol used to communicate information between the validation server 102 and the call agent 24 to facilitate the separation of validation services from services of the call agent 24. For example, the call agent 24 may use VAP to inform the validation server 102 of the telephone numbers for which the call agent 24 claims ownership. In one example, the call agent 24 may transmit the owned telephone numbers 114 to the validation server 102 in the form of an XML document that includes Direct Inward Dialing (DID) information. The validation server 102 may store at least a portion of the owned telephone numbers 114 in the memory 112. For example, the portion of the owned telephone numbers 114 may include a range of phone numbers identified by a prefix. Alternatively or additionally, the call agent 24 may ask the validation server 102 to place a portion of the owned telephony numbers 114 into the registry 108, without storing them in the validation server 102. Alternatively or additionally, the owned telephone numbers 114 stored in the memory 112 of the validation server 102 may be entered by a user instead of received from the call agent 24.

The validation server 102 may also store the owned telephone numbers 114 or a portion of the owned telephone numbers 114 in the registry 108. When the registry 108 is implemented as a P2P network, the portion of the P2P registry data 118 may be stored in the memory 112 of the validation server 102. By storing the owned telephone numbers in the registry 108, the validation server 102 may advertise the call agent 24 as owning the telephone numbers. By transmitting the owned telephone numbers 114 to the validation server 102, the call agent 24 may control which telephone numbers are stored in the registry 108 without being directly connected to the P2P network. Additionally, the validation server 102 may advertise owned telephone numbers 114 for more than one call agent 24.

The call agent 24 may use VAP to inform the validation server when the call agent 24 makes and/or receives PSTN calls. For example, the call agent 24 may transmit call attributes to the validation server 102 for outgoing and incoming PSTN calls. The call agent 24 may indicate whether the call is an outgoing or incoming PSTN call. The validation server 102 may store the call attributes 116 received from the call agent 24 in the memory 112 of the validation server 102. The validation server 102 may use the call attributes 116 of the PSTN calls to verify call agents as valid call agents for telephone numbers or ranges of telephone numbers.

The process to verify the call agents for the telephone may be any one of the processes described above for verifying call agents. To verify the call agents as valid call agents for telephone numbers, the validation server 102 may communicate with the registry 108 and the call agents. To communicate with the registry 108, the validation server 102 may use any suitable registry protocol, such as a P2P protocol. For example, the validation server 102 may query the registry 108 for a destination telephone number using a hash-based prefix match. The validation server 102 may communicate with the call agents using one of the authentication protocols described above. For example, the validation server 102 may initiate a TLS connection to the call agent found as a result of querying the registry 108. The validation server 102 may generate, exchange, and store the password used during authentication to verify a call agent for the destination telephone. In one example, the validation server 102 may communicate with a different validation server that is used by the call agent to be verified instead of communicating with the call agent directly.

In one example, the validation server 102 may discover and verify a call agent for the destination telephone number immediately after receiving the call attributes for the destination telephone number from the call agent 24. In a different example, the validation server 102 may wait a random amount of time after receiving the call attributes before discovering and verifying the call agent for the destination telephone number. In one example, the validation server 102 may periodically verify the destination number.

After the validation server 102 verifies one of the call agents for a telephone number based on the call attributes 116, the validation server 102 has learned a new VoIP route. A VoIP route may map a destination telephone number to a call agent. Alternatively or in addition, the VoIP route may map a prefix, such as a portion of the destination telephone number, to the call agent. In one example, the VoIP route may include a destination telephone number and a network address of the call agent to which the destination telephone number is mapped. The validation server 102 may transmit the new VoIP route to the call agent 24 over VAP. The call agent 24 may store the new VoIP route for use in subsequently initiating VoIP calls to the destination telephone number.

The validation server 102, the call agent 24, or both may store validation information, such as usernames and passwords, used when initiating new calls to the call agents. In one example, the validation server 102 may transmit the validation information to the call agent 24 when transmitting the new VoIP route to the call agent 24. Alternatively or in addition, the call agent 24 may transmit a request for the validation information to the validation server 102 as part of initiating a new call to the call agent identified in the new VoIP route. In one example, the validation information may include a ticket issued by the call agent that is identified in the new VoIP route.

Upon receipt of the valid VoIP route, the call agent 24 may store the route in a cache of valid VoIP routes 120. The cache of valid VoIP routes 120 may be included in the call agent 24 or stored in a database separate from the call agent 24. Multiple call agents 24 may access the cache of valid VoIP routes 120 stored in the database. In one example, the multiple call agents 24 may share a common validation server 102. Alternatively or in addition, the validation server 102 may store the valid VoIP routes 120 in the database instead of transmitting the valid VoIP routes 120 to the call agent 24 using VAP. In one example, the call agent 24 may periodically transmit a request to the validation server 102 for valid VoIP routes 120. Alternatively or in addition, if there are multiple call agents 24, the validation server 102 may transmit the VoIP route to all of the call agents 24.

The call agent 24 may receive a call initiation message from one of the clients 28, where the call initiation message identifies a destination telephone number. When the call agent 24 receives the call initiation message, the call agent 24 may search the valid VoIP routes 120 for the VoIP route matching the destination telephone number. If the call agent 24 finds a matching VoIP route, the call agent 24 may initiate a VoIP call based on the matching VoIP route instead of initiating a PSTN call. However, if the call agent 24 does not find a matching VoIP route, the call agent 24 may initiate a PSTN call. In one example, upon receipt of the call initiation message from one of the clients 28, the call agent 24 may transmit a request to the validation server 102 for a valid VoIP route corresponding to the destination telephone number. If the validation server 102 returns the valid VoIP route, the call agent 24 may initiate the call to the call agent identified in the valid VoIP route. Otherwise, the validation server 102 may initiate the call over the PSTN 26.

In one implementation, the call agent 24 may determine whether the destination telephone number is a telephone number internal to an enterprise associated with the call agent 24 or whether the destination telephone number is to a telephone number external to the enterprise. The telephone number external to the enterprise may be reachable over the PSTN 26 and/or the internet 22. If the destination telephone number is internal to the enterprise, the call agent 24 may route the call accordingly and avoid issuing a request to the validation server 102.

The call agent 24 may receive a call initiation message from an originating call agent on the Internet 22. In one implementation, the call agent 24 may transmit a request to the validation server 102 to validate the call initiation message. For example, the call agent 24 may transmit a password and call information included in the call initiation message to the validation server 102 for validation. The validation server 102 may send a response back to the call agent 24 indicating whether the call initiation message is valid. The validation server 102 may reject the call if the call initiation message is invalid and accept the call initiation message otherwise. In one implementation, the call agent 24 may validate the call initiation message without the validation server 102. In one implementation, the call agent 24 may accept the message without validation of the call.

The call agent 24 may periodically flush or remove valid VoIP routes 120. For example, each one of the VoIP routes 120 received from the validation server 102 may have an expiration date. The call agent 24 may remove or not use any expired VoIP routes 120 from the cache of valid VoIP routes.

In one example, the firewall 104 may send a request to the validation server 102 to validate a call initiation message received from an originating call agent on the Internet 22. If the validation server 102 indicates the message is invalid, then the firewall 104 may be configured to not forward the message to the call agent 24. Alternatively or in addition, the firewall 104 may validate the call initiation message without sending the request to the validation server 102.

VAP may be based on Internet Protocol or any other suitable protocol. In one example, VAP may be based on transport control protocol/Internet Protocol (TCP/IP) or TCP/TLS. VAP may include programmatic interfaces for at least one of the following: (1) to communicate the owned telephone numbers 114 of the call agent 24, (2) to communicate the call attributes 116, (3) to communicate the valid VoIP routes 120, and (4) verify passwords included in call initiation messages. Alternatively or in addition, VAP may be based on an interprocess communication (IPC) protocol, such as named pipes, anonymous pipes, Common Object Request Broker Architecture (CORBA), Simple Object Access Protocol (SOAP), Distributed Component Object Model (DCOM), or any other Remote Procedure Call (RPC) protocols. VAP may include connection pooling, connection keep-alive and/or other features for maintaining and/or optimizing connectivity between the validation server 102 and the call agent 24.

The separation of the functionality between the validation server 102 and the call agent 24 may result in the validation server 102 not being required to set up a new call. Instead, the validation server 102 may be used to learn new valid VoIP routes and to transmit the valid VoIP routes to the call agent 24 for later use.

FIGS. 10-13 illustrate example flow diagrams for the operation of the system 100 when two calls are made from an originating client to a destination client. In the examples illustrated in FIGS. 11-14, the call agent 24 communicates with a PBX gateway to make and receive calls over the PSTN 26.

Figure 10:
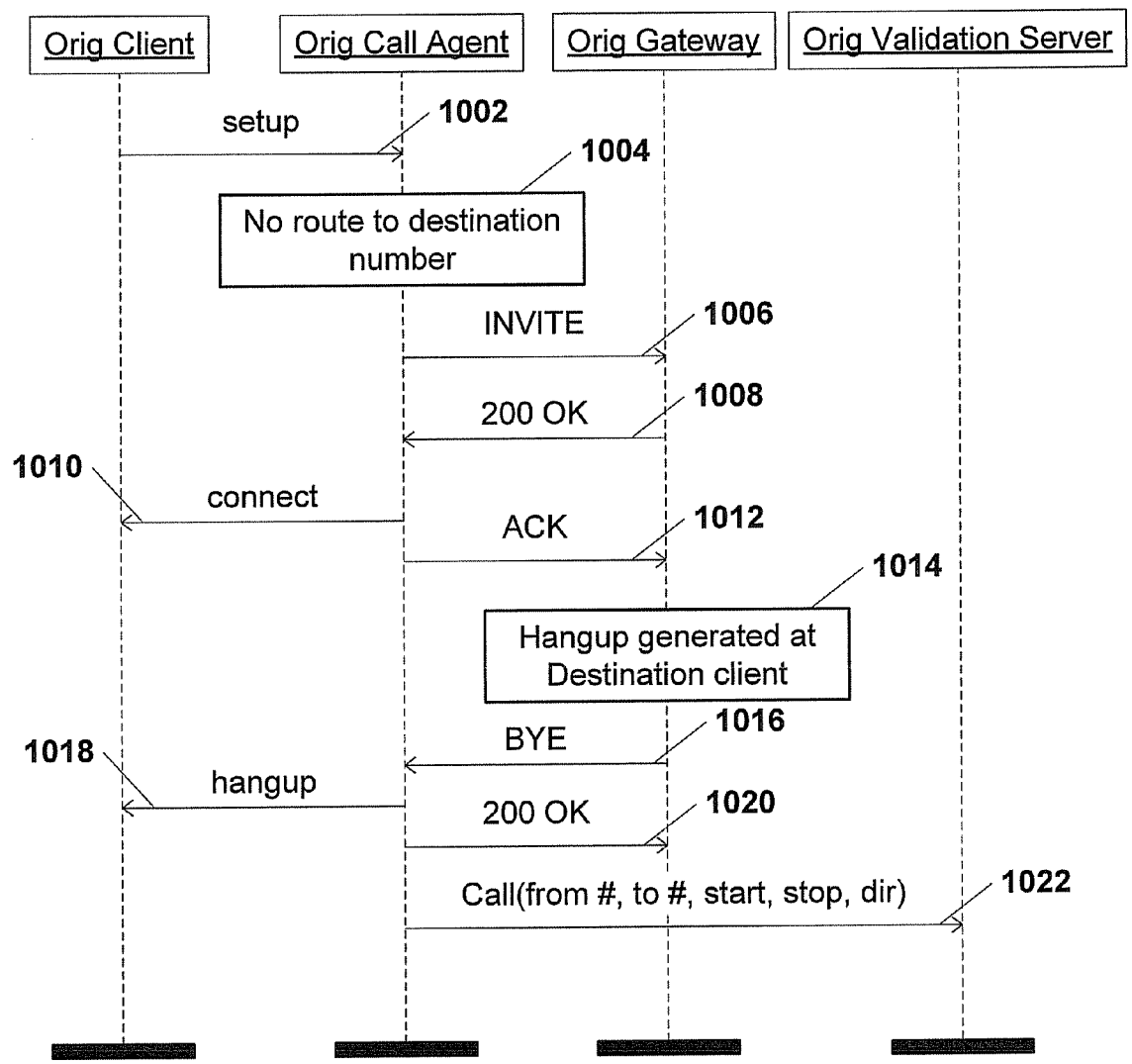
FIG. 10 illustrates an example flow diagram for the operation of the system at the originating side when the first of two calls is made

FIG. 10 illustrates an example flow diagram for the operation system 100 at the originating side when the first of the two calls is made. At the originating side, the operation may begin in act 1002 when the client 28 transmits a setup message to the call agent 24 to initiate the first call. In act 1004, the call agent 24 may search the valid VoIP routes 120 for a destination telephone number that is included in the setup message. In act 1006, when the call agent 24 fails to find a valid route for the destination telephone number, the call agent 24 may transmit an invite message to the gateway to make a PSTN call.

In act 1008, the gateway indicates to the call agent 24 that the invite message was accepted at the destination client. In act 1010, the call agent 24 transmits a connect message to the client 28 to indicate the call is connected. In act 1012, the call agent 24 transmits an acknowledgement message to the gateway, and the first call is established over the PSTN 26.

In act 1014, the gateway detects a hang-up generated at the destination client. In response, the gateway transmits, in act 1016, a message to the call agent 28 indicating that the call is terminated. In act 1018, the call agent 28 transmits a hang-up message to the client to relay the indication that the call is over. In act 1020, the call agent 28 transmits an indication to the gateway that the termination of the call was received. In response to the termination of the first call, the call agent 28, in act 1022, transmits call attributes 116 to the validation server 102 for subsequent validation.

Figure 11:
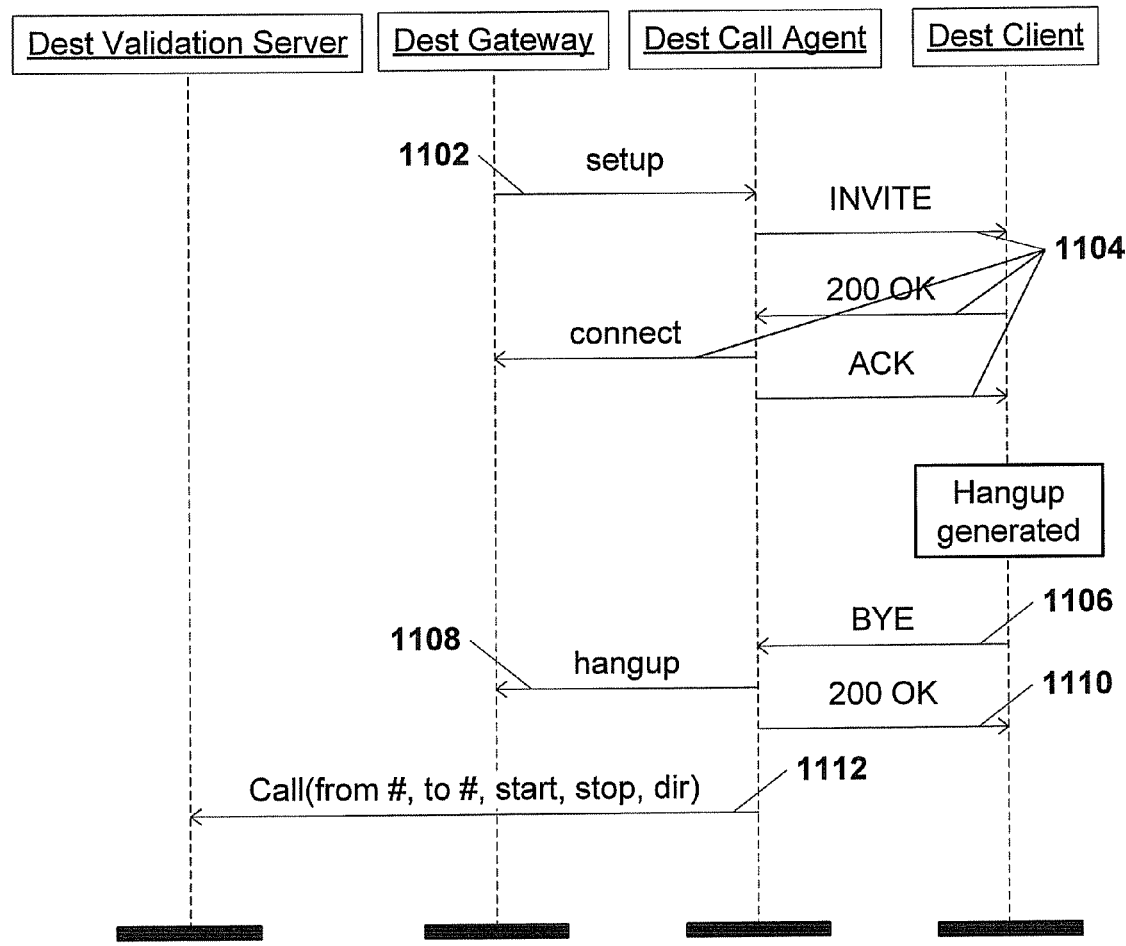
FIG. 11 illustrates an example flow diagram for the operation of the system at the destination side when the first of the two calls is made.

FIG. 11 illustrates an example flow diagram for the operation of the system 100 at the destination side when the first of the two calls is made. In act 1102, the destination gateway, in response to receipt of the setup request from the originating gateway, may transmit a setup message to the destination call agent 24. In act 1104, the destination call agent 24 completes the establishment of the first PSTN call.

In act 1106, the destination client 28 transmits a hang-up message to the destination call agent 24 to indicate that the first call is to be terminated. In act 1108, the destination call agent 24 transmits a hang-up message to the destination gateway. In act 1110, the destination call agent 24 transmits an indication to the destination client 28 that the call is terminated.

In act 1112, in response to the termination of the call, the destination call agent 24 transmits the call attributes 116 of the first PSTN call to the destination validation server 102.

Figure 12:
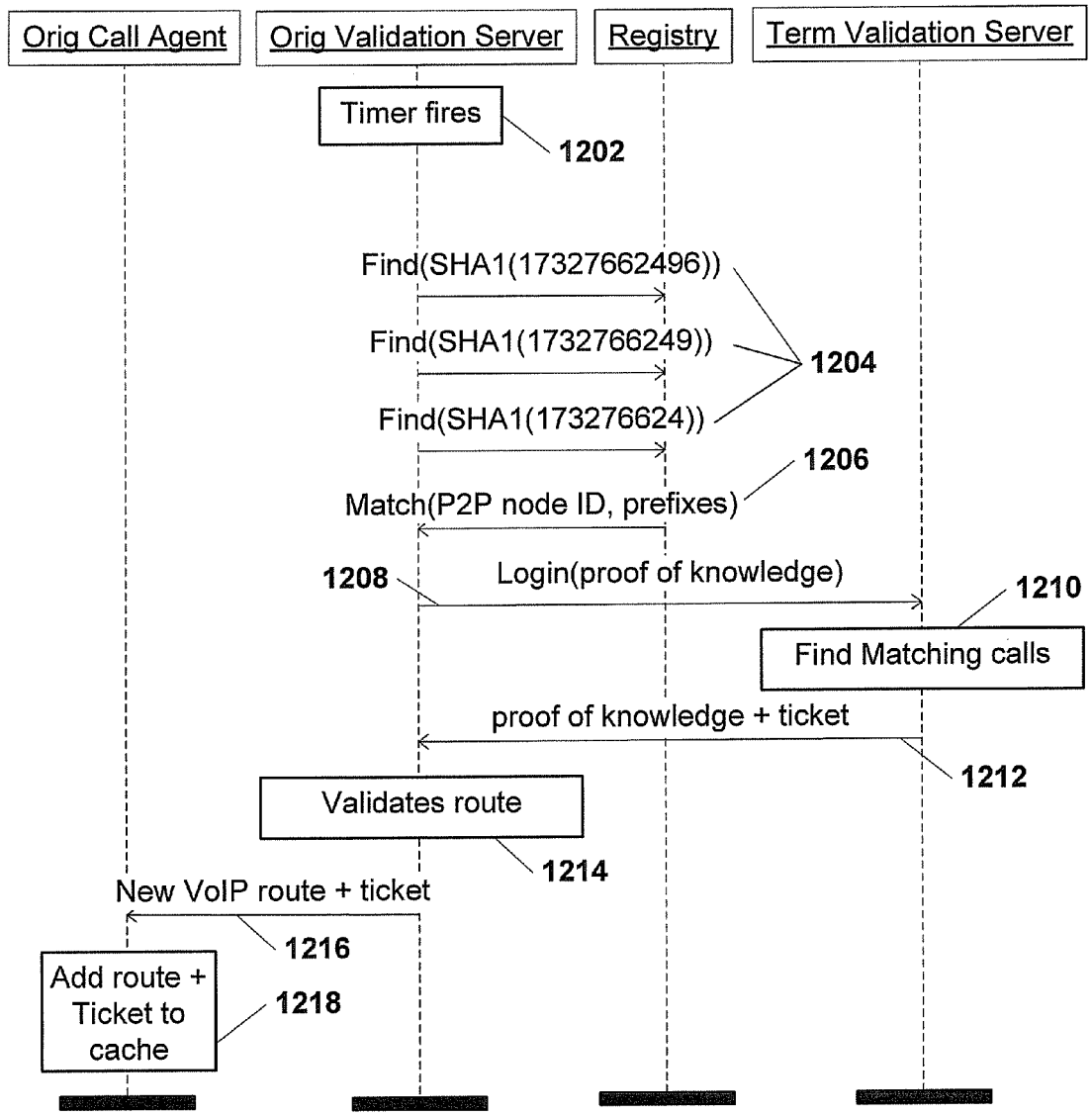
FIG. 12 illustrates an example flow diagram for the operation of the system when an originating validation server validates a VoIP route corresponding to the telephone number of the destination client.

FIG. 12 illustrates an example flow diagram for the operation of the system 100 when the originating validation server 102 validates the VoIP route corresponding to the telephone number of the destination client. Having received the call attributes 116 of the first PTSN call, the validation server 102 may precede with learning a new VoIP route for the destination telephone number and validating the new VoIP route. For example, the validation server 102 may, in act 1202, start the process of learning and validating the new VoIP route when a timer expires. In one example, the timer may be set to expire after a random length of time has passed since the timer last triggered the process of learning and validating routes. Other scheduling or triggers may be used.

In act 1204, the originating validation server 102 may repeatedly transmit search requests to the registry 108 in order to find a P2P node that matches the destination phone number or a portion thereof. In each of the search requests, the validation server 102 may use a different portion of the destination telephone number. In act 1206, the registry 108 may return an identifier of the P2P matching the portion of the destination telephone number in the search request. In the example illustrated in FIG. 12, the identifier identifies the destination validation server 102.

In act 1208, the originating validation server 102 begins authentication with the destination validation server 102 based on the call attributes of the first PSTN call. In act 1210, the destination validation server 102 searches for calls matching the information provided by the originating validation server 102. Upon finding the call attributes for the first PSTN call, the destination validation server 102, in act 1212, provides proof of knowledge of the first PSTN call, VoIP routing information, and a ticket. The VoIP routing information may include identification of the destination call agent 24. The destination call agent 24 may, in some examples, require the ticket 132 to be included in a call invite request before accepting the call invite request. In act 1214, the originating validation server 102 validates the new VoIP route based on the proof of knowledge of the first PSTN call provided by the destination validation server 102.

In act 1216, the originating validation server 102 transmits the VoIP route including the ticket 132 to the originating call agent 24. In act 1218, the originating call agent 24 stores the VoIP route in the cache of valid VoIP routes 120.

Figure 13:
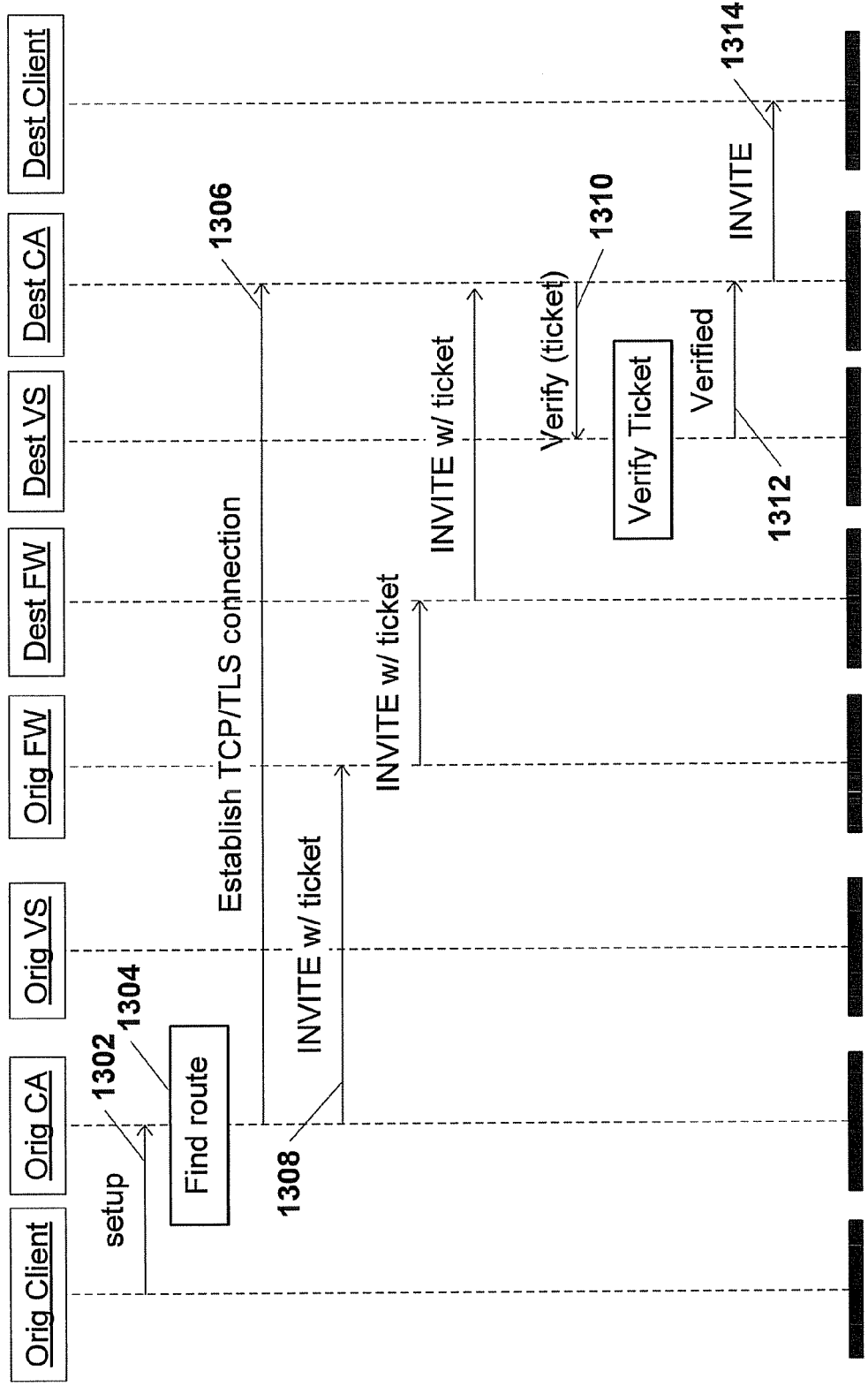
FIG. 13 illustrates an example flow diagram for the operation of the system when the second of the two calls is made.

FIG. 13 illustrates an example flow diagram for the operation of the system 100 when the second of the two calls is made. As when initiating the first call, the originating client 28 begins the operation, in act 1302, by transmitting a setup message to the originating call agent 24. In act 1304, the originating call agent 24 searches the cache of valid VoIP routes 120 for the destination telephone number included in the setup message and finds the VoIP route corresponding to the destination telephone number.

Using the information in the VoIP route, in act 1306, the originating call agent 24 may establish, for example, a TCP/TLS connection to the destination call agent 24. In act 1308, the originating call agent 24 may transmit an invite message that includes the ticket to the destination call agent 24 over the TCP/TLS connection. The invite message may pass through an originating firewall and a destination firewall on the way to the destination call agent 24. The firewalls may also analyze the invite message and decide whether to pass the invite message toward the destination call agent 24. For example, the destination firewall may include or be configured with an application-level gateway (ALG) that determines whether the ticket included in the invite message is valid. The ALG may transmit the ticket to the destination validation server 102 in a request for the destination validation server 102 to validate the ticket.

The operation may continue, in act 1310, by the destination call agent 24 verifying that the ticket in the invite message is valid. To do so, the destination call agent 24 may transmit the ticket to the destination validation server 102 in a request for the destination validation server 102 to validate the ticket. In act 1312, the destination validation server 102 may respond to the request indicating that the ticket is valid for the invite message. In act 1314, the destination validation server 102 may transmit an invite message to the destination client 28 to complete the initiation of the second call. Therefore, a VoIP call is setup instead of a PSTN call.

Figure 14:
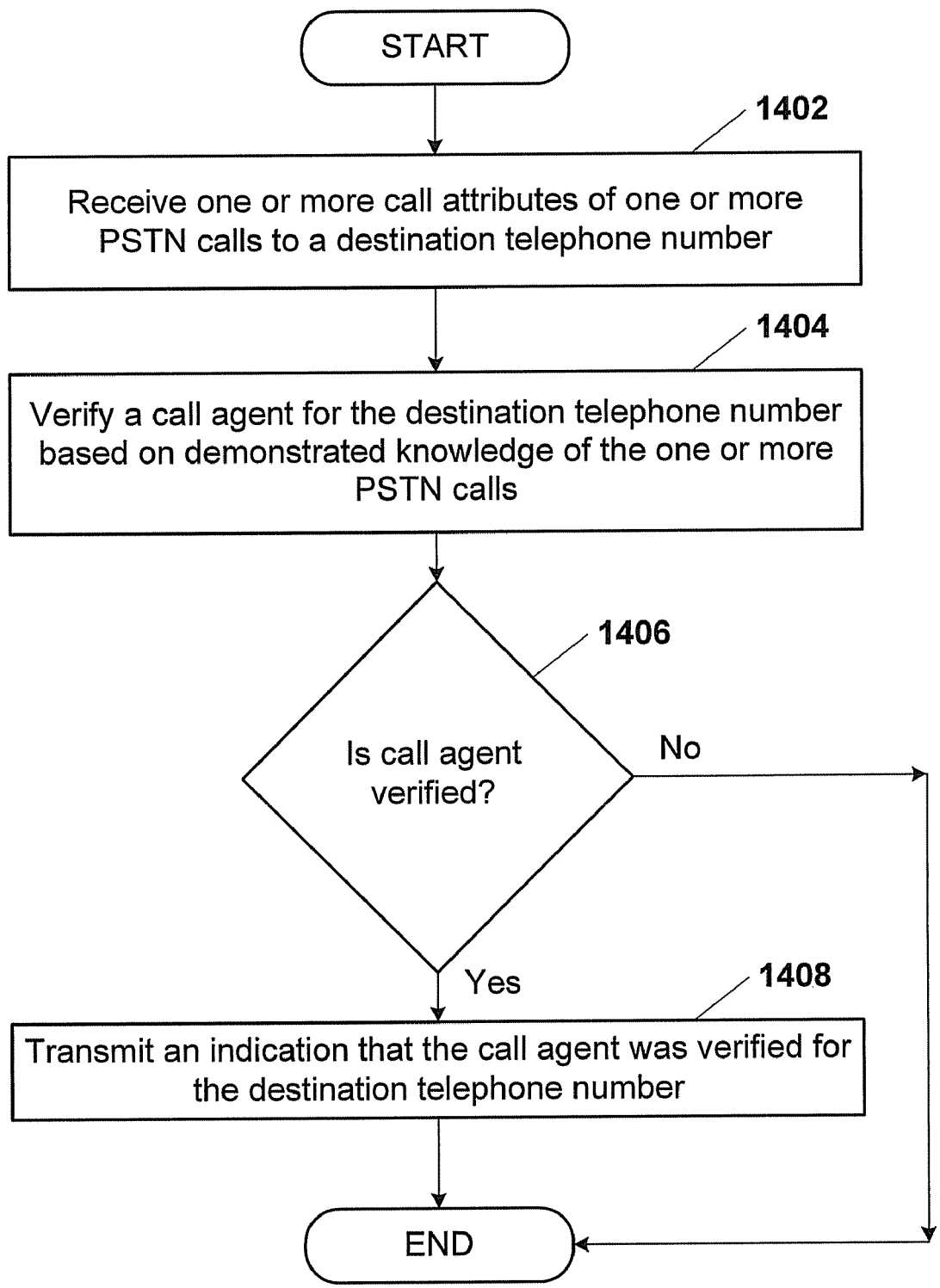
FIG. 14 illustrates one embodiment of a method to validate a call agent.

FIG. 14 illustrates one embodiment of a method to validate a call agent. Additional, different, or fewer acts may be performed. The acts may be performed in a different order than illustrated in FIG. 14.

The method may begin in act 1402 by receiving one or more call attributes of one or more PSTN calls to a destination telephone number. The method may, in act 1404, continue by verifying the call agent for the destination telephone number based on demonstrated knowledge of the one or more PSTN calls. For example, verifying the call agent may include using an EKE protocol to verify that the call agent or a corresponding validation server has knowledge of the call attributes of the PSTN calls.

In act 1406, the method may include determining whether the call agent is verified for the destination telephone number. If the call agent is not verified, then the method may complete. If the call agent is verified, then the operation may continue in act 1408 by transmitting an indication that the call agent was verified for the destination telephone number. For example, the indication may be a VoIP route that includes a mapping of the destination telephone number to the call agent.

As described above, implementations of the present invention provide a fully, 100% distributed solution that allows any enterprise to make a VoIP call to any other enterprise in the world, without any central coordination, central services, or configuration. It is completely plug-n-play, and is very secure. Another advantage of the implementations described herein is that they do require any special functionality from PSTN providers. The implementations describe above enable call agents to connect to each other directly over IP without requiring an intermediate service provider for voice services. Connections are seamless for end users, because they can make and receive calls with the phone numbers they already use.

The present invention has been explained with reference to specific embodiments. For example, while embodiments of the present invention have been described as operating in connection with P2P networks and PSTN networks, the present invention may be used in connection with any suitable network environment.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof.

Any of the devices, features, methods, and/or techniques described may be mixed and matched to create different systems and methodologies. While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. An apparatus comprising:
a memory; and
a processor in communication with the memory, the memory including computer code executable with the processor, wherein the computer code is configured to:
receive at least one call attribute for each respective one of at least one public switched telephone network (PSTN) call initiated from an originating Voice-over-Internet-Protocol (VoIP) call agent over the PSTN to a destination telephone number;
verify calls to the destination telephone number over the PSTN reach a destination VoIP call agent based on receipt of demonstrated knowledge by the destination VoIP call agent of at least one corresponding call attribute, the at least one corresponding call attribute determined to match the at least one call attribute for each respective one of the at least one PSTN call initiated over the PSTN to the destination telephone number, the at least one call attribute for each respective one of the at least one PSTN call demonstrating knowledge of a respective one of the at least one PSTN call; and
transmit an indication to the originating VoIP call agent that a VoIP route mapping the destination telephone number to the destination VoIP call agent is valid based on the verification that calls to the destination telephone number over the PSTN reach the destination VoIP call agent.

2. The apparatus of claim 1, wherein the computer code configured to receive the at least one call attribute is further configured to receive the at least one call attribute from the originating call agent.

3. The apparatus of claim 1, wherein the computer code is further configured to:
receive at least one telephone number assigned to the originating VoIP call agent; and
store the at least one telephone number in a peer-to-peer network to indicate the at least one telephone number is assigned to a node in the peer-to-peer network, wherein the node is associated with the originating VoIP call agent.

4. The apparatus of claim 1, wherein the computer code is further configured to:
receive a call attribute of a PSTN call to at least one telephone number, wherein the originating VoIP call agent received the PSTN call;
receive a request to demonstrate knowledge of the PSTN call; and
in response to the request, transmit proof of the knowledge of the call attribute of the PSTN call.

5. The apparatus of claim 1, wherein the at least one call attribute includes a start time of the respective one of the at least one PSTN call.

6. The apparatus of claim 1, wherein the at least one call attribute includes an end time of the respective one of the at least one PSTN call.

7. The apparatus of claim 1, wherein the VoIP route is included in the indication that the VoIP route is valid.

8. Logic encoded in one or more tangible non-transitory media for execution with a processor and when executed operable to:
transmit, to a validation server, at least one call attribute for a public switched telephone network (PSTN) call initiated to a destination telephone number over the PSTN;
receive, from the validation server, information indicative of a verification of a destination Voice-over-Internet-Protocol (VoIP) call agent as an owner of the destination telephone number, wherein the verification is based on a determination that the destination VoIP call agent demonstrates knowledge of at least one corresponding call attribute that indicates the at least one corresponding call attribute matches the at least one call attribute of the PSTN call initiated over the PSTN, the at least one call attribute demonstrating knowledge of the PSTN call;

receive a call initiation message, the call initiation message including the destination telephone number; and initiate, in response to receipt of the call initiation message, a VoIP call over a VoIP network to the destination VoIP call agent instead of a new PSTN call over a circuit switched network based on receipt of the information indicative of the verification of the destination VoIP call agent as the owner of the destination telephone number.

9. The tangible media of claim 8, wherein the logic when executed is further operable to store a VoIP route in a cache of valid VoIP routes in response to receipt of the information indicative of the verification of the destination VoIP call agent as the owner of the destination telephone number, wherein the VoIP route maps the destination telephone number to the destination VoIP call agent.

10. The tangible media of claim 9, wherein the logic to initiate the VoIP call over the VoIP network to the destination VoIP call agent is further operable to search the cache of valid VoIP routes for an entry matching the destination telephone number to determine whether the information indicative of the verification of the destination VoIP call agent as the owner of the destination telephone number was received.

11. The tangible media of claim 8, wherein the logic when executed is further operable to transmit information received in a VoIP invite message to the validation server for validation of the VoIP invite message.

12. The tangible media of claim 8, wherein the logic when executed is further operable to transmit owned telephone numbers to the validation server for advertisement of an originating call VoIP agent as an owner of the owned telephone numbers.

13. The tangible media of claim 8, wherein communication to and from the validation server conforms to a validation access protocol.

14. A method comprising:
receiving at least one call attribute of at least one public switched telephone network (PSTN) call initiated from an originating Voice-over-Internet-Protocol (VoIP) call agent to a destination telephone number over the PSTN, the at least one call attribute demonstrating knowledge of the at least one PSTN call;

verifying, with a processor, that calls to the destination telephone number over the PSTN reach a destination VoIP call agent based on a determination that the destination VoIP call agent demonstrates knowledge of at least one corresponding call attribute that indicates the at least one corresponding call attribute matches the at least one call attribute of the at least one PSTN call to the destination telephone number over the PSTN; and transmitting, to the originating VoIP call agent, an indication that calls to the destination telephone number are routable as VoIP calls to the destination VoIP call agent based on the verification that calls to the destination telephone number over the PSTN reach the destination VoIP call agent.

15. The method of claim 14, wherein verifying that calls to the destination telephone number over the PSTN reach the destination VoIP call agent further comprises:
transmitting a request to a destination validation server associated with the destination VoIP call agent, the request indicating the destination validation server is to demonstrate knowledge of the at least one call attribute of the at least one PSTN call; and receiving a response to the request from the destination validation server, the response including proof of knowledge of the at least one corresponding call attribute of the at least one corresponding PSTN call, the proof of knowledge indicating that the destination VoIP call agent demonstrates knowledge of the at least one corresponding call attribute.

16. The method of claim 14, wherein verifying that calls to the destination telephone number reach the destination VoIP call agent over the PSTN further comprises delaying a random amount of time after receiving the at least one call attribute of the at least one PSTN call before transmitting a request for proof of knowledge of the at least one call attribute of the at least one PSTN call.

17. The method of claim 14 further comprising querying a peer-to-peer network to discover a network address of the destination VoIP call agent associated with the destination phone number.

18. The method of claim 14, wherein transmitting the indication that calls to the destination telephone number are routable as VoIP calls to the destination VoIP call agent comprises transmitting Voice over Internet Protocol (VoIP) call routing information to the originating VoIP call agent, the VoIP call routing information including the destination telephone number and a network address of the destination VoIP call agent.

19. The method of claim 14 further comprising:
receiving a range of telephone numbers assigned to the originating call agent; and
storing the range of telephone numbers and an identifier of the originating VoIP call agent in a peer-to-peer network to advertise the originating call VoIP agent as assigned to the range of telephone numbers.

20. An apparatus comprising:
a memory; and
a processor in communication with the memory, the memory including computer code executable with the processor, wherein the computer code is configured to:
receive at least one call attribute of at least one public switched telephone network (PSTN) call received at a destination Voice-over-Internet-Protocol (VoIP) call agent and initiated to a destination telephone number over the PSTN, the at least one call attribute of the at least one PSTN call demonstrating knowledge of the at least one PSTN call; and
transmit proof of knowledge of the at least one call attribute of the at least one PSTN call as verification that calls over the PSTN to the destination telephone number reach the destination VoIP call agent, the proof of knowledge transmitted over a network different than the PSTN, wherein calls to the destination telephone number from an originating VoIP call agent are routed as VoIP calls to the destination VoIP call agent in response to a determination that the proof of knowledge received from the apparatus indicates a match of the at least one call attribute of the at least one PSTN call with at least one corresponding call attribute of at least one corresponding call initiated from the originating VoIP call agent.

21. The apparatus of claim 20 further configured to receive a request for the verification that calls over the PSTN to the destination telephone number reach the destination VoIP call agent, wherein the apparatus is configured to transmit the proof of knowledge of the at least one call attribute of the at least one PSTN call in response to receipt of the request.

22. The apparatus of claim 20 further configured to:
receive at least one call attribute of at least one call to a target telephone number initiated from the destination VoIP call agent over the PSTN; and
verify that calls to a target telephone number over the PSTN reach the originating VoIP call agent based on the at least one call attribute of the at least one call to the target telephone number initiated from the destination VoIP call agent over the PSTN.

\* \* \* \* \*